US008543441B2

(12) United States Patent
Siegel

(10) Patent No.: US 8,543,441 B2
(45) Date of Patent: Sep. 24, 2013

(54) MAP ASSOCIATION WITH CALENDAR ENTRY

(75) Inventor: Laurence Siegel, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 439 days.

(21) Appl. No.: 12/391,901

(22) Filed: Feb. 24, 2009

(65) Prior Publication Data
US 2010/0214876 A1 Aug. 26, 2010

(51) Int. Cl.
G06Q 10/00 (2012.01)
(52) U.S. Cl.
USPC ............ 705/7.19; 455/456.1; 455/456.3
(58) Field of Classification Search
USPC .......... 705/9, 10, 30; 709/205, 206; 715/262
See application file for complete search history.

(56) References Cited

U.S. PATENT DOCUMENTS

| | | | |
|---|---|---|---|
| 5,845,257 A | 12/1998 | Fu et al. | |
| 5,940,488 A | 8/1999 | DeGrazia et al. | |
| 7,039,596 B1 | 5/2006 | Lu | |
| 7,043,362 B2* | 5/2006 | Krull et al. | 701/211 |
| 7,084,758 B1* | 8/2006 | Cole | 340/539.11 |
| 7,284,033 B2* | 10/2007 | Jhanji | 709/206 |
| 7,328,029 B1* | 2/2008 | Adamczyk et al. | 455/456.3 |
| 7,680,591 B2* | 3/2010 | Nagata et al. | 701/516 |
| 7,721,210 B2* | 5/2010 | Mansikkaniemi et al. | 715/733 |
| 7,783,988 B2 | 8/2010 | Curran | |
| 8,000,726 B2* | 8/2011 | Altman et al. | 455/456.3 |
| 8,355,862 B2* | 1/2013 | Matas et al. | 701/408 |
| 2002/0118808 A1 | 8/2002 | Kelleher et al. | |
| 2002/0133390 A1 | 9/2002 | Kroeger | |
| 2002/0174199 A1 | 11/2002 | Horvitz | |
| 2003/0045301 A1* | 3/2003 | Wollrab | 455/456 |
| 2003/0050986 A1* | 3/2003 | Matthews et al. | 709/206 |
| 2003/0154116 A1* | 8/2003 | Lofton | 705/8 |
| 2005/0015316 A1* | 1/2005 | Salluzzo | 705/30 |
| 2005/0018826 A1 | 1/2005 | Benco et al. | |
| 2005/0054341 A1 | 3/2005 | Keohane et al. | |
| 2005/0079873 A1 | 4/2005 | Caspi et al. | |
| 2005/0210104 A1* | 9/2005 | Torvinen | 709/205 |
| 2005/0238156 A1 | 10/2005 | Turner | |
| 2005/0259145 A1 | 11/2005 | Schrader et al. | |
| 2006/0004703 A1* | 1/2006 | Spivack et al. | 707/2 |
| 2006/0041460 A1* | 2/2006 | Aaron | 705/8 |
| 2006/0190313 A1 | 8/2006 | Lu | |
| 2007/0055561 A1* | 3/2007 | Perrella et al. | 705/9 |
| 2007/0060108 A1* | 3/2007 | East et al. | 455/414.1 |
| 2007/0118809 A1 | 5/2007 | Ozugur et al. | |

(Continued)

FOREIGN PATENT DOCUMENTS

EP 1422501 * 5/2004

OTHER PUBLICATIONS

Siegel; U.S. Appl. No. 12/391,855, filed Feb. 24, 2009.
Siegel; U.S. Appl. No. 12/391,890, filed Feb. 24, 2009
Siegel; U.S. Appl. No. 12/391,892, filed Feb. 24, 2009.
Siegel; Non-Final Office Action mailed Mar. 3, 2011 for U.S. Appl. 12/391,885, filed Feb. 24, 2009.

(Continued)

Primary Examiner — Brian Epstein
(74) Attorney, Agent, or Firm — Greenblum & Bernstein, P.L.C.

(57) ABSTRACT

A map is associated with a calendar entry. An electronic calendar includes at least one calendar entry. The calendar entry includes at least one calendar entry location for indicating a geographic location of where the calendar entry is scheduled to occur. At least one option associated with the calendar entry is provided. In response to receiving a user selection of the option, a map associated with the calendar entry location is provided.

18 Claims, 34 Drawing Sheets

(56) References Cited

U.S. PATENT DOCUMENTS

| | | | |
|---|---|---|---|
| 2007/0172046 A1 | 7/2007 | Pfleging et al. | |
| 2007/0186193 A1 | 8/2007 | Curran | |
| 2007/0260694 A1 | 11/2007 | Boss et al. | |
| 2008/0037751 A1 | 2/2008 | Aldrey et al. | |
| 2008/0040442 A1* | 2/2008 | Fieldman | 709/207 |
| 2008/0075251 A1 | 3/2008 | Jefferson et al. | |
| 2008/0086455 A1* | 4/2008 | Meisels et al. | 707/3 |
| 2008/0086512 A1* | 4/2008 | Fahys | 707/104.1 |
| 2008/0109718 A1* | 5/2008 | Narayanaswami | 715/262 |
| 2008/0115088 A1 | 5/2008 | Frankel et al. | |
| 2008/0132243 A1* | 6/2008 | Spalink et al. | 455/456.1 |
| 2008/0155029 A1 | 6/2008 | Helbling et al. | |
| 2008/0159511 A1 | 7/2008 | Keohane et al. | |
| 2008/0165944 A1 | 7/2008 | Rosenthal et al. | |
| 2009/0006994 A1* | 1/2009 | Forstall et al. | 715/764 |
| 2009/0110169 A1 | 4/2009 | Whitsell et al. | |
| 2009/0196410 A1 | 8/2009 | Mani | |
| 2010/0030889 A1 | 2/2010 | Fuchs et al. | |
| 2010/0215166 A1 | 8/2010 | Siegel | |
| 2010/0217646 A1 | 8/2010 | Siegel | |
| 2010/0246571 A1 | 9/2010 | Geppert et al. | |

OTHER PUBLICATIONS

Siegel; Non-Final Office Action mailed Feb. 3, 2011 for U.S. Appl. No. 12/391,890, filed Feb. 24, 2009.
Siegel; Non-Final Office Action mailed Aug. 30, 2011 for U.S. Appl. No. 12/391,892, filed Feb. 24, 2009.
Siegel; Non-Final Office Action mailed Oct. 3, 2011 for U.S. Appl. No. 12/391,890, filed Feb. 24, 2009.
Siegel; Final Office Action mailed Jan. 13, 2012 for U.S. Appl. No. 12/391,890, filed Feb. 24, 2009.
Siegel; Final Office Action mailed May 23, 2011 for U.S. Appl. No. 12/391,890, filed Feb. 24, 2009.
Siegel; Non-Final Office Action mailed May 21, 2012 for U.S. Appl. No. 12/391,890, filed Feb. 24, 2009.
Office Action from U.S. Appl. No. 12/391,890 dated Jan. 8, 2013.
Office Action from U.S. Appl. No. 12/391,890 dated Mar. 6, 2013.
Office Action from U.S. Appl. No. 12/391,892, dated Feb. 27, 2013.
Glezer, Chanan, A Conceptual Model of an Interorganizational Intelligent Meeting-Scheduler (IIMS), Journal of Strategic Information Systems 12 (2003) 47-70, Accepted Nov. 19, 2002.
Google Scholar search results for (calendar calendaring) Around (overlay features), dated Feb. 14, 2013.

* cited by examiner

Mozilla Firefox
File  Edit  View  History  Bookmark  Tools  Help
☐ http://asgldsdev06b.asg.bang/bin/auth2.jsp  ☐  ☐ http://asgldsd=88asgn=Northtown ☐

The New ● at&t
Your World Delivered

Northtowns Soccer Club of 2007 Champions northtowns soccer club

I am a member of the team, and I rely on the team, I deter to it and sacrifice for it because the team not the individual, is the ultimate champion.

Hungry after the game wear your uniform for 20% off
Pizza Hut
Corner of 5th & Main

FULL SIZE CHEESE PIZZA
$19.97

Sports  50% off
Authority

[Calendar] [Photos] [Video]
← 2134 →
Search | Google Search | Help
Discussion ← 1142

| | Title | Date | Posts |
|---|---|---|---|
| 2132a → | After Game Pizza Party | 10:04 AM 11-20-2008 | 18 |
| 2132b → | Don't for get to bring your own drinks for practice | 9:53 AM 11-03-2008 | 44 |
| 2132c → | Beckham might have hurt his Ankle | 8:45 AM 11-03-2008 | 5 |
| 2132d → | Team photo shoot | 8:22 AM 11-03-2008 | 11 |
| 2132e → | Team practice | 7:56 AM 11-03-2008 | 5 |
| 2132f → | Study this soccer clip before your next game | 11:34 PM 11-02-2008 | 18 |
| 2132g → | Game Vs. Cosmos | 11:27 PM 11-02-2008 | 33 |
| 2132h → | Guest Pro soccer Clinic | 11:11 PM 11-02-2008 | 2 |
| 2132i → | Game Vs. Tornados | 9:15 PM 11-02-2008 | 4 |

New Topic ← 2132
Search [   ]          More >> ← 2130
Powered By YELLOWPAGES.COM
[Yellow Pages ▼] [GO!]

Weather
Atlanta GA. - Current
56° ☼
Clear       More >

Soccer News
New England in MSL Cup for third
McClaren recalls Beck for finals
More >

Members ← 1128
[By Status] [By Name] [By Custom]
- Suet Li northtowns soccer
- Ronald Ng northtowns soccer
- Hellen Mitchel northtowns soccer
- Barbar Jones northtowns soccer
- Huong Hua northtowns soccer
- Larry Inaustin northtowns soccer

MAP ASSOCIATION WITH CALENDAR ENTRY

CROSS REFERENCE

This application relates to U.S. application Ser. No. 12/391,885, U.S. application Ser. No. 12/391,890, and U.S. application Ser. No. 12/391,892, all of which are filed the same day as the present application and all of which are incorporated by reference in their entireties.

BACKGROUND

As communication mediums become more sophisticated, and social networking becomes more prevalent, users demand more options by which to communicate with their contacts. Additionally, users desire more functionality with regard to calendars and address books to better streamline appointments, communications, etc. Further, as groups such as business groups, athletic teams, social groups and/or other groups of people associate, a technique for efficiently facilitating communication among the members of the groups is desired.

SUMMARY

Included are embodiments for associating a map with a calendar entry. More specifically, at least one embodiment of a method includes providing an electronic calendar, the electronic calendar including at least one calendar entry, the at least one calendar entry including at least one calendar entry location for indicating a geographic location of where the calendar entry is scheduled to occur. Some embodiments include providing at least one option associated with the at least one calendar entry and in response to receiving a user selection of the at least one option, providing a map associated with the at least one calendar entry location.

Also included are embodiments for a system. At least one embodiment of a system includes a memory component that stores logic configured to provide an electronic calendar, the electronic calendar including at least one calendar entry, the at least one calendar entry including at least one calendar entry location for indicating a geographic location of where the calendar entry is scheduled to occur. In some embodiments, the memory component stores logic configured to provide at least one option associated with the at least one calendar entry and logic configured to, in response to receiving a user selection of the at least one option, provide a map associated with the at least one calendar entry location.

Also included are embodiments of a computer-readable medium. At least one embodiment of a computer-readable medium includes a program that causes a computer to provide an electronic calendar, the electronic calendar including at least one calendar entry, the at least one calendar entry including at least one calendar entry location for indicating a geographic location of where the calendar entry is scheduled to occur. In some embodiments, the program causes the computer to provide at least one option associated with the at least one calendar entry and in response to receiving a user selection of the at least one option, provide a map associated with the at least one calendar entry location.

Other embodiments and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 12 depicts an exemplary embodiment of an event interface, illustrating an event occurrence reminder, similar to the interface from FIG. 11.

FIG. 13 depicts an exemplary embodiment of the community portal interface, from FIG. 11, further illustrating communications mediums available for group members.

FIG. 15 depicts an exemplary embodiment of the community portal interface from FIG. 11, further illustrating a dialog box that may be presented in response to selection of an add to my calendar option.

FIG. 16 depicts an exemplary embodiment of the community portal interface from FIG. 11, further illustrating searching capabilities that may be utilized.

FIG. 18 depicts an exemplary embodiment of a photos section of the community portal interface from FIG. 11.

FIG. 20 depicts an exemplary embodiment of a video section of the community portal interface from FIG. 11.

FIG. 21 depicts an exemplary embodiment of a discussion section of the community portal interface from FIG. 11.

FIG. 23 depicts an exemplary embodiment of a web interface for providing one or more groups to which a user is a member, similar to the interface from FIG. 22.

DETAILED DESCRIPTION

Figure 1:
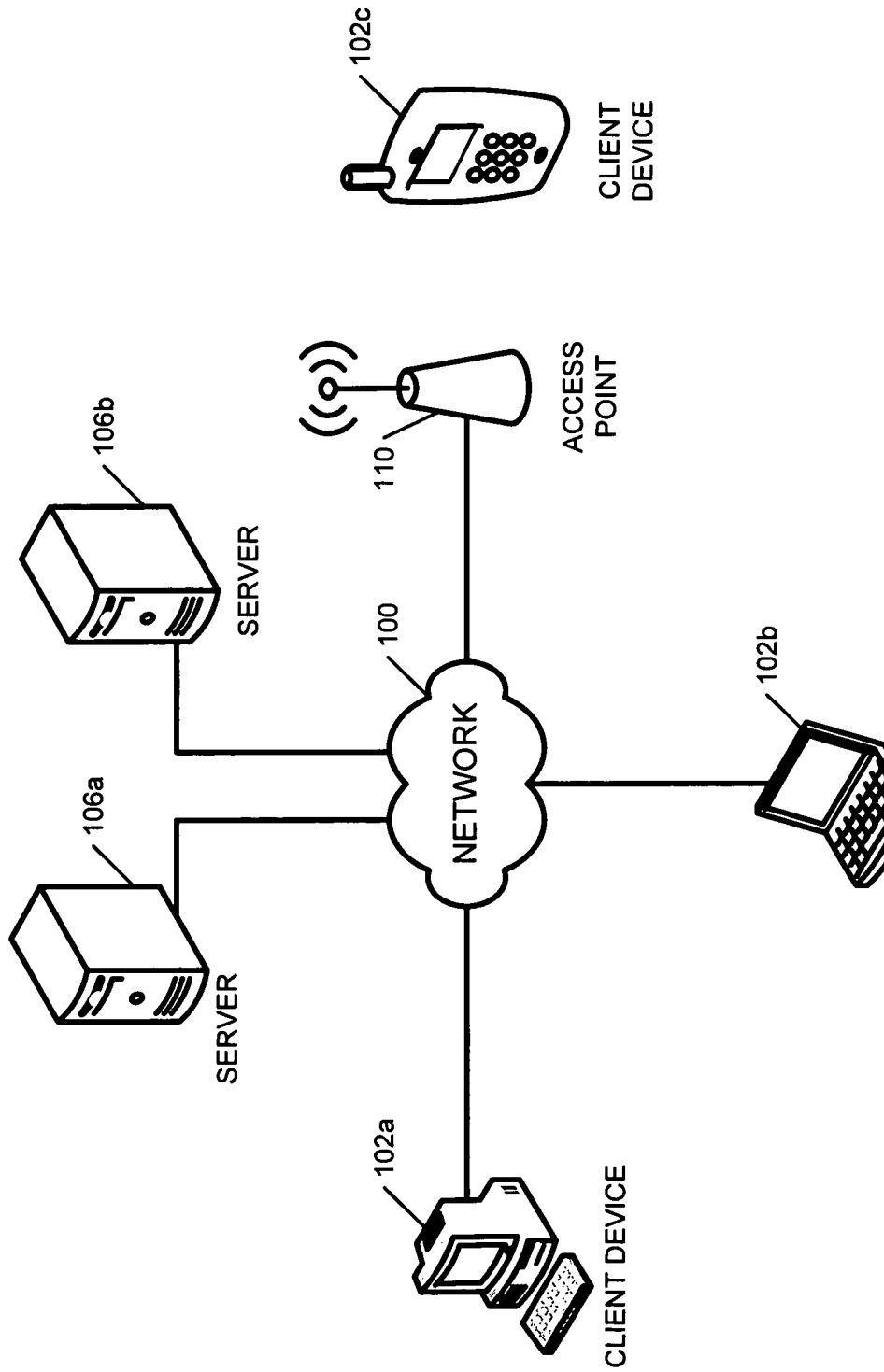
FIG. 1 depicts an exemplary embodiment of a communications network for facilitating communication between users.

FIG. 1 depicts an exemplary embodiment of a communications network for facilitating communication between users. More specifically, as illustrated in the nonlimiting example of FIG. 1, a network 100 may be utilized and include a wide area network (WAN), such as the Internet, a public switched telephone network (PSTN), mobile communications network (MCN) and/or other network. Similarly, the network 100 may include a wireline and/or a wireless local area network (LAN). Regardless of the communications medium and protocol, the network 100 may be coupled to one or more client devices 102a, 102b, 102c. The client devices 102a, 102b, 102c (collectively referred to as client device 102) may include a personal computer, laptop, and/or other device that is configured for communicating with (and via) the network 100. While the client devices 102a, 102b may be wireline devices, the client device 102c may be configured for wireless communications and be configured to communicate with (and/or via) the network 100 via an access point 110 or other wireless communications device. The access point may be configured as a wireless cellular tower, a wireless fidelity (Wi-Fi) hotspot, a worldwide interoperability for microwave access (WIMAX) tower, and/or other wireless node.

Also included in the nonlimiting example of FIG. 1 are servers 106a and 106b. The servers 106a and 106b may be configured to facilitate the communication of electronic messages, which may include email, instant messages, short message service (SMS) messages audio messages, video messages, and/or other electronic messages. In some embodiments, the server 106a may be part of an Internet service provider (ISP) and/or otherwise be configured to provide messaging and/or Internet services to an account associated with the client device 102a. Similarly, in some embodiments, the servers 106 may be configured to provide messaging services to one or more accounts associated with client devices 102b and 102c.

One should note that, while the diagram of FIG. 1 illustrates the servers 106a, 106b as single components, this is a nonlimiting example. More specifically, depending on the particular configuration, the servers 106a, 106b may include a plurality of servers, data storage components, and/or other components. Additionally, while the discussion with regard to FIG. 1 describes embodiments where messages are sent via the servers 106a, 106b, this is also a nonlimiting example, as in some embodiments, the servers may facilitate a communication pathway between the message sender and message recipient, but may be configured to receive only a copy of the messages sent.

Figure 2:
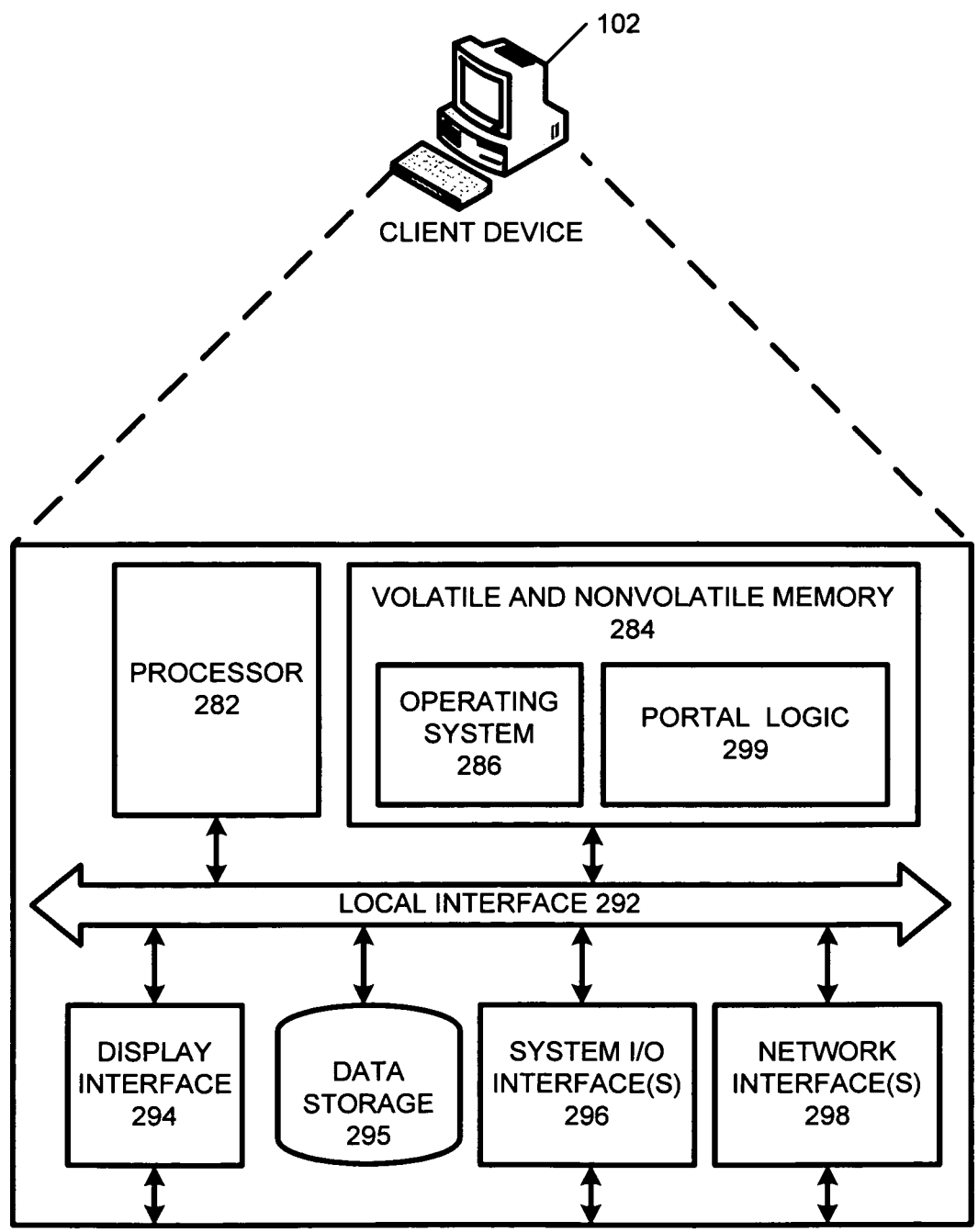
FIG. 2 depicts an exemplary embodiment of a client device that may be configured to operate in the environment of FIG. 1.

FIG. 2 depicts an exemplary embodiment of a client device 102 that may be configured to operate in the environment of FIG. 1. Although a wire-line device (e.g., the client device 102a) is illustrated, this discussion can be applied to wireless devices, as well. According to exemplary embodiments, in terms of hardware architecture, the client device 102 includes a processor 282, a memory component 284, a display interface 294, data storage 295, one or more input and/or output (I/O) device interface(s) 296, and/or one or more network interfaces 298 that are communicatively coupled via a local interface 292. The local interface 292 can include, for example but not limited to, one or more buses and/or other wired or wireless connections. The local interface 292 may have additional elements, which are omitted for simplicity, such as controllers, buffers (caches), drivers, repeaters, and receivers to enable communications. Further, the local interface 292 may include address, control, and/or data connections to enable appropriate communications among the aforementioned components. The processor 282 may be a device for executing software, particularly software stored in the memory component 284. The processor 282 can include any custom made or commercially available processor, a central processing unit (CPU), an auxiliary processor among several processors associated with the client device 102, a semiconductor based microprocessor (in the form of a microchip or chip set), a macroprocessor, and/or generally any device for executing software instructions.

The memory component 284 can include any one or combination of volatile memory elements (e.g., random access memory (RAM, such as DRAM, SRAM, SDRAM, etc.))

and/or nonvolatile memory elements (e.g., flash memory, read only memory (ROM), hard drive, tape, CDROM, etc.). Moreover, the memory component 284 may incorporate electronic, magnetic, optical, and/or other types of storage media. One should note that the memory component 284 can have a distributed architecture (where various components are situated remote from one another), but can be accessed by the processor 282.

The software in the memory component 284 may include one or more separate programs, which may include an ordered listing of executable instructions for implementing logical functions. In the example of FIG. 2, the software in the memory component 284 may include portal logic 299 (which may include one or more logical components), as well as an operating system 286. The operating system 286 may be configured to control the execution of other computer programs and provides scheduling, input-output control, file and data management, memory management, and communication control and related services. The portal logic 299 may be configured to facilitate communication of one or more messages (emails, instant messages, SMS messages, faxes, and/or other messages), facilitate creation of and/or participation in a group and/or group community portal. Additionally, the portal logic 299 may be configured to provide other options, as discussed in more detail below.

In at least one embodiment, the portal logic 299 may be configured as a system component and/or module embodied as software and may also be construed as a source program, executable program (object code), script, and/or any other entity that includes a set of instructions to be performed. When constructed as a source program, portal logic 299 may be translated via a compiler, assembler, interpreter, or the like (which may or may not be included within the memory component 284) so as to operate properly in connection with the operating system 286.

The input/output devices that may be coupled to the system I/O interface(s) 296 may include input devices, for example but not limited to, a keyboard, mouse, scanner, touch screen, microphone, etc. Further, the input/output devices may also include output devices, for example but not limited to, a printer, display, speaker, etc. Additionally, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more of the network interfaces 298 for facilitating communication with one or more other devices. More specifically, network interface 298 may include any component configured to facilitate a connection with another device. While in some embodiments, among others, the client device 102 can include the network interface 298 that includes a personal computer memory card international association (PCMCIA) card (also abbreviated as "PC card") for receiving a wireless network card, this is a nonlimiting example. Other configurations can include the communications hardware within the client device 102, such that a wireless network card is unnecessary for communicating wirelessly. Similarly, other embodiments include the network interfaces 298 for communicating via a wired connection. Such interfaces may be configured with Universal Serial Bus (USB) interfaces, serial ports, and/or other interfaces.

If the client device 102 includes a personal computer, workstation, or the like, the software in the memory component 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the client device 102 is activated.

When the client device 102 is in operation, the processor 282 may be configured to execute software stored within the memory component 284, to communicate data to and from the memory component 284, and to generally control operations of the client device 102 pursuant to the software. Software in the memory component 284, in whole or in part, may be read by the processor 282, perhaps buffered within the processor 282, and then executed.

One should also note that while the description with respect to FIG. 2 includes the client device 102 as a single component, this is a nonlimiting example. More specifically, in at least one embodiment, the client device 102 can include a plurality of servers, personal computers, telephones, and/or other devices. Similarly, while the description of FIG. 2 describes the client device 102 as a personal computer, this is also a nonlimiting example. More specifically, depending on the particular exemplary embodiment, other components, such as the servers 106 and/or the access point 110 may include similar elements and/or logic.

Additionally, while the portal logic 299 is illustrated in FIG. 2 as including a single software component, this is also a nonlimiting example. In at least one embodiment, the portal logic 299 may include one or more components, embodied in software, hardware, and/or firmware. Additionally, while the portal logic 299 is depicted as residing on a single device, such as client device 102, the portal logic 299 may include one or more components residing on one or more different devices.

Figure 3:
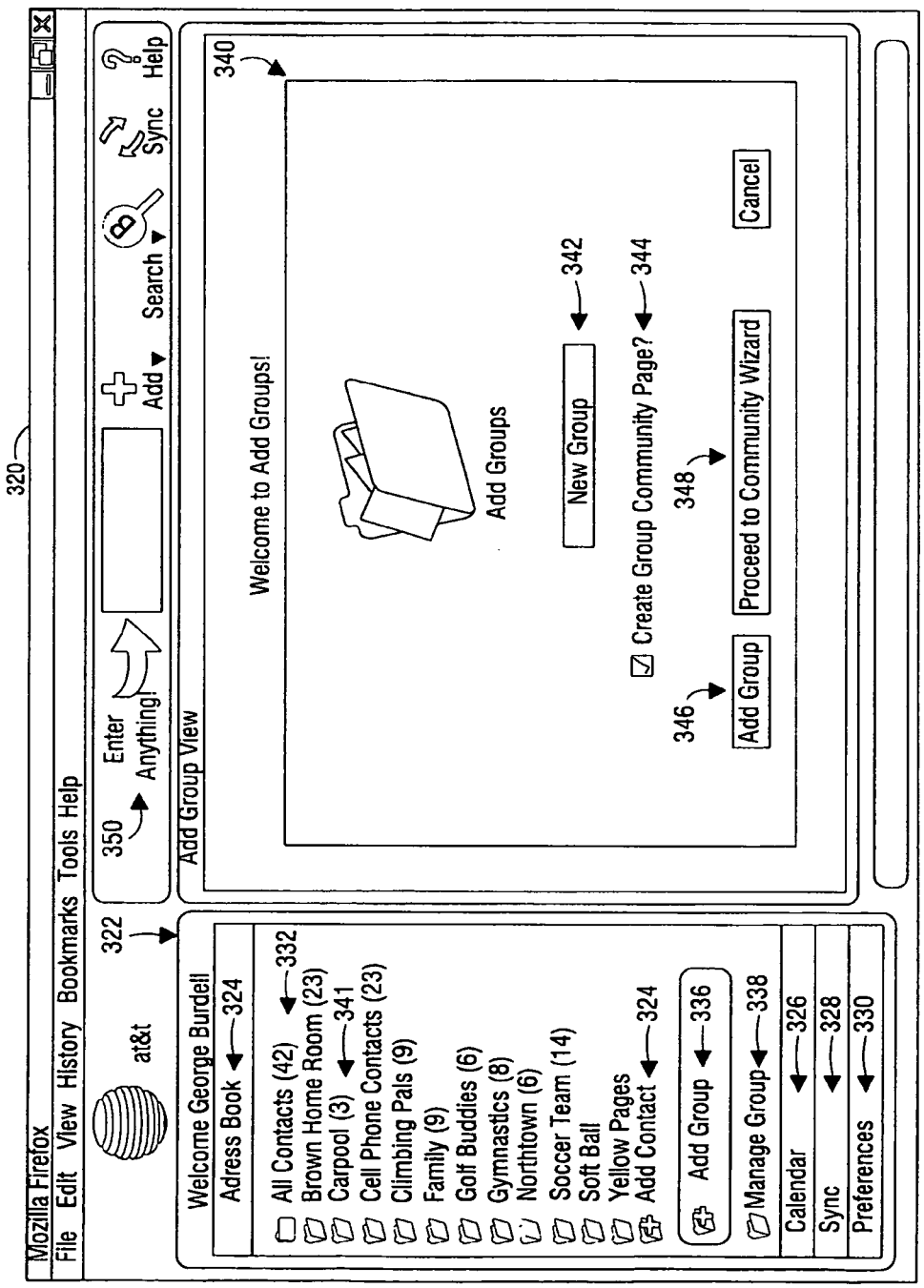
FIG. 3 depicts an exemplary embodiment of a user interface for providing an address book, such as may be displayed on the client device from FIG. 2.

FIG. 3 depicts an exemplary embodiment of a user interface 320 for providing an address book, such as may be displayed on the client device from FIG. 2. More specifically, the user interface 320 may be provided by the client device 102 (and/or, depending on the nonlimiting example, from the server 106) from FIG. 1. While in some embodiments, the user interface 320 may be provided by a local application, with contacts, appointments, etc. being stored at the client device 102, some embodiments may utilize a "cloud" application, where contacts, appointments, and other data are stored at a remote server (e.g., server 106) and accessible by any of a plurality of client devices 102 (e.g., the user has access to the same data via a plurality of different devices). Such a cloud application may have a related local application stored at the client device 102 for initiating communication with the server 106; however, this is a nonlimiting example, as the server 106 may be configured to provide a web interface that utilizes no such local application.

Included with the user interface 320 is an actions toolbar 322, which may include an address book menu 324, a calendar menu 326, a sync menu 328, and a preferences menu 330. The address book menu 324 may include an all contacts heading 332 that includes one or more sub-headings for groups of the user. A group may include one or more contacts from the all contacts heading 332 (or from elsewhere). Additionally, the address book menu 324 may also include an add contact heading 334, an add group heading 336, and a manage groups heading 338.

In operation, by selecting the all contacts heading 332, a user's contacts may be displayed. Similarly, by selecting a sub-heading, such as the carpool sub-heading 341, the contacts designated to group carpool may be provided to the user. Similarly, by selecting the add contact heading 334, a new contact may be added to the all contacts category 332 and/or to a group of contacts listed in the sub-headings. By selecting the manage groups heading 338, existing group settings may be changed. Similarly, by selecting the add group heading 336, a new group may be added, via the add groups window 340.

The add groups window 340 may facilitate the addition of one or more groups by providing a text prompt 342 for a user to enter a group name. Additionally, the user can select whether the group will be associated with a group community page via a group community page option 344. If the user does not desire a group community page for this group, the user may simply add the group by selecting an add group option 346. This will cause the group to be added to the address book menu 324, as a new sub-heading. If, however, the user desires to associate the group with a group community page, the user may select the group community page option 344 and select the community wizard option 348, described in more detail with regard to FIGS. 4-7. In such a scenario, the group may be created in the address book menu 324, as a new sub-heading. In addition, a link to a group community page may also be created for members to the group to access.

Also included in the nonlimiting example of FIG. 3 is a quickbar 350. The quickbar 350 may include one or more default and/or user-created options, such as a text search option, an add option (for adding contacts, calendar entries, etc.), a form search option, a sync option, and a help option.

Figure 4:
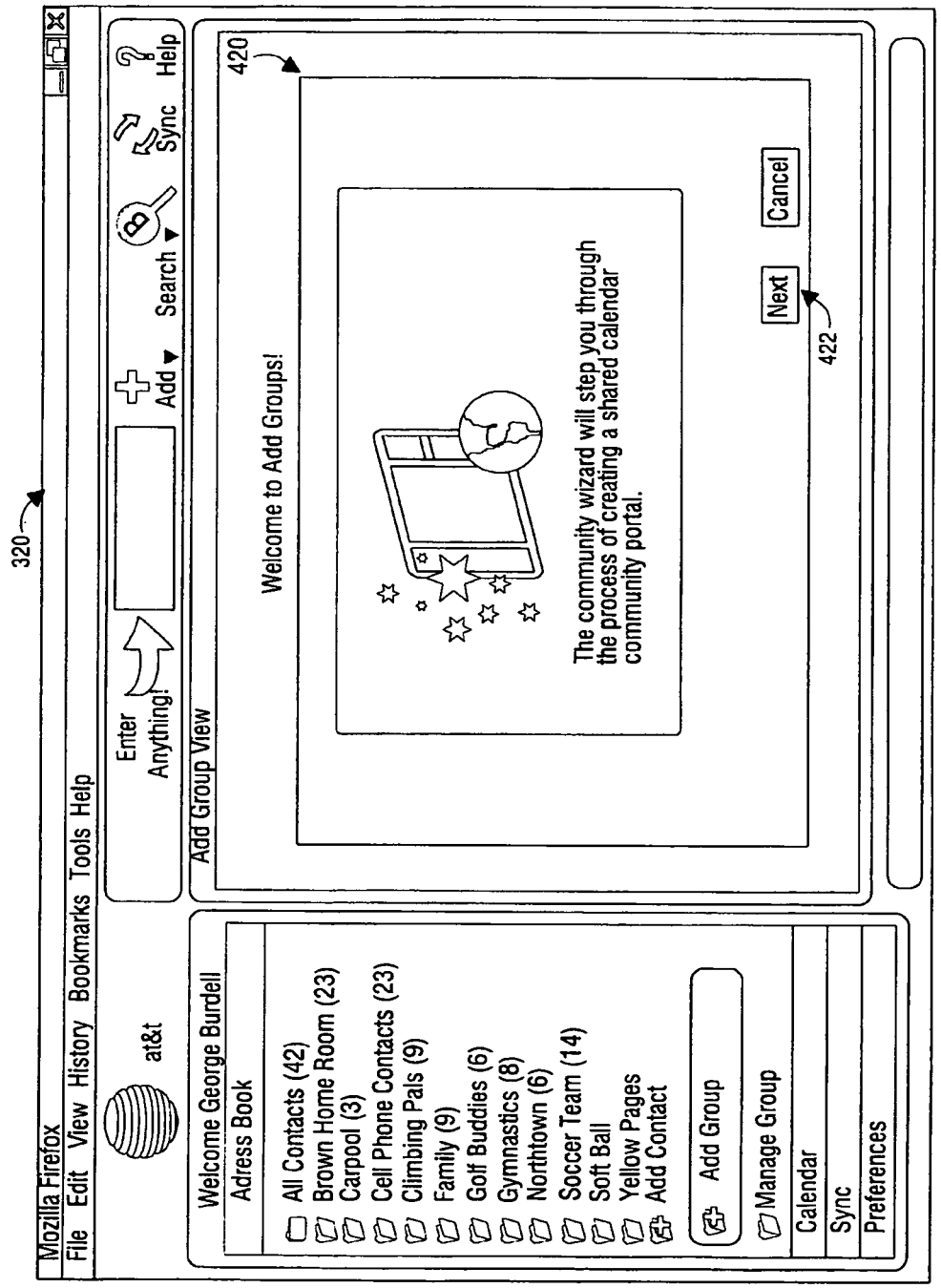
FIG. 4 depicts an exemplary embodiment of a community wizard interface, which may be provided in response to selection of a create group community page option from FIG. 3.

FIG. 4 depicts an exemplary embodiment of a community wizard interface 420, which may be provided in response to selection of a create group community page option 344 from FIG. 3. As illustrated in the nonlimiting example of FIG. 4, the community wizard option 348 from FIG. 3 may yield a wizard introduction window 420 for guiding the user through a process of creating a group community page. By selecting a next option 422, the wizard may proceed to provide one or more layout options, as illustrated in FIG. 5.

Figure 5:
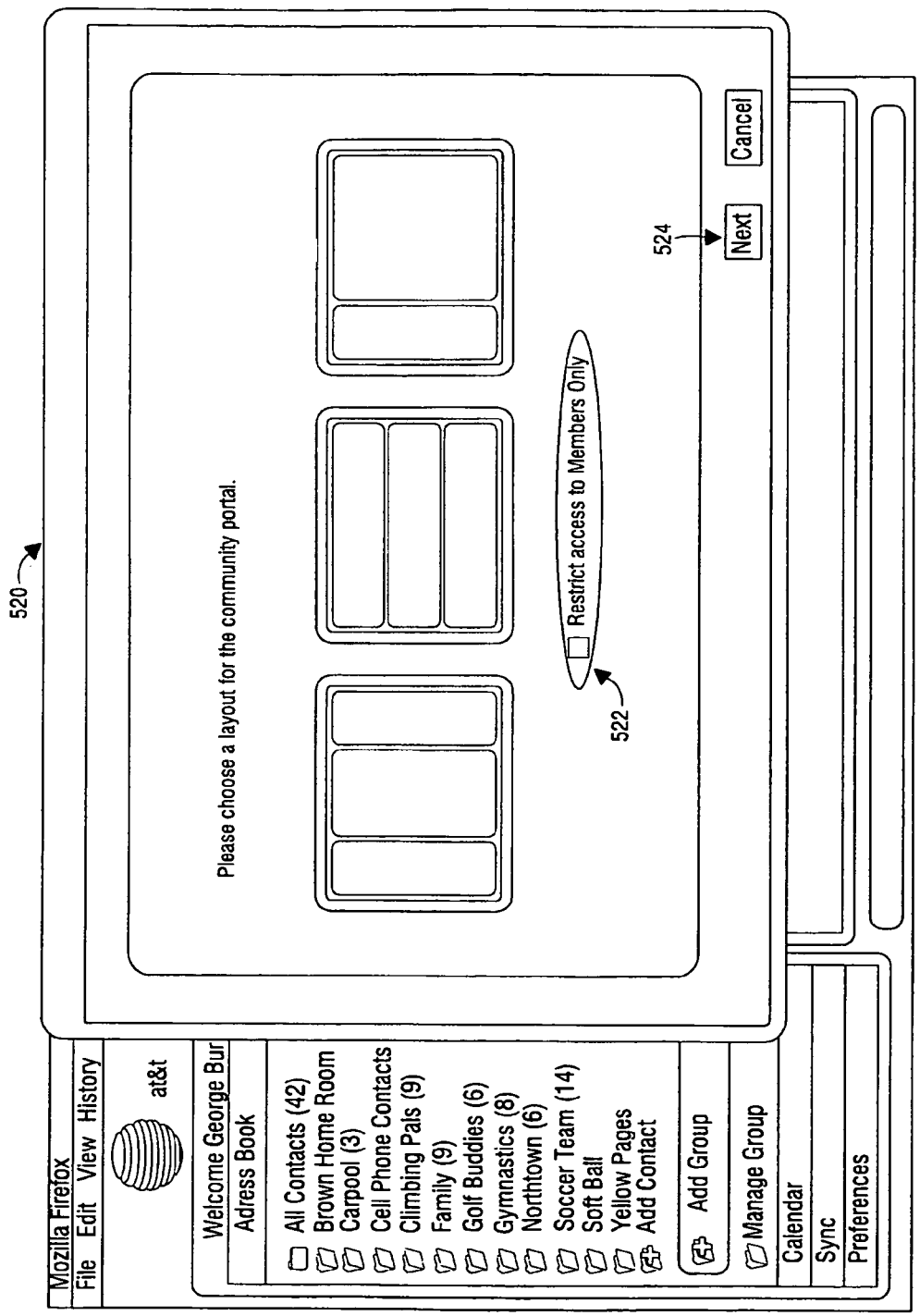
FIG. 5 depicts an exemplary embodiment of a layout interface, which may provide customization options for creating a group community page, similar to the interface from FIG. 4.

FIG. 5 depicts an exemplary embodiment of a layout interface, which may provide customization options for creating a group community page, similar to the interface from FIG. 4. As illustrated in the nonlimiting example of FIG. 5, the community wizard may provide a layout configuration window 520 for designing and/or selecting the group community page layout according to one or more templated (and/or user designed) layouts. By selecting one or more of the provided layout templates, the group community page will be created with the corresponding organization. Additionally provided in the layout configuration window 520 is a restriction option 522 to determine whether the user wishes to restrict access to the group community page to members only or whether no such restriction is desired. By selecting a next option 524, the wizard may proceed to determine additional options of the group community page.

Figure 6:
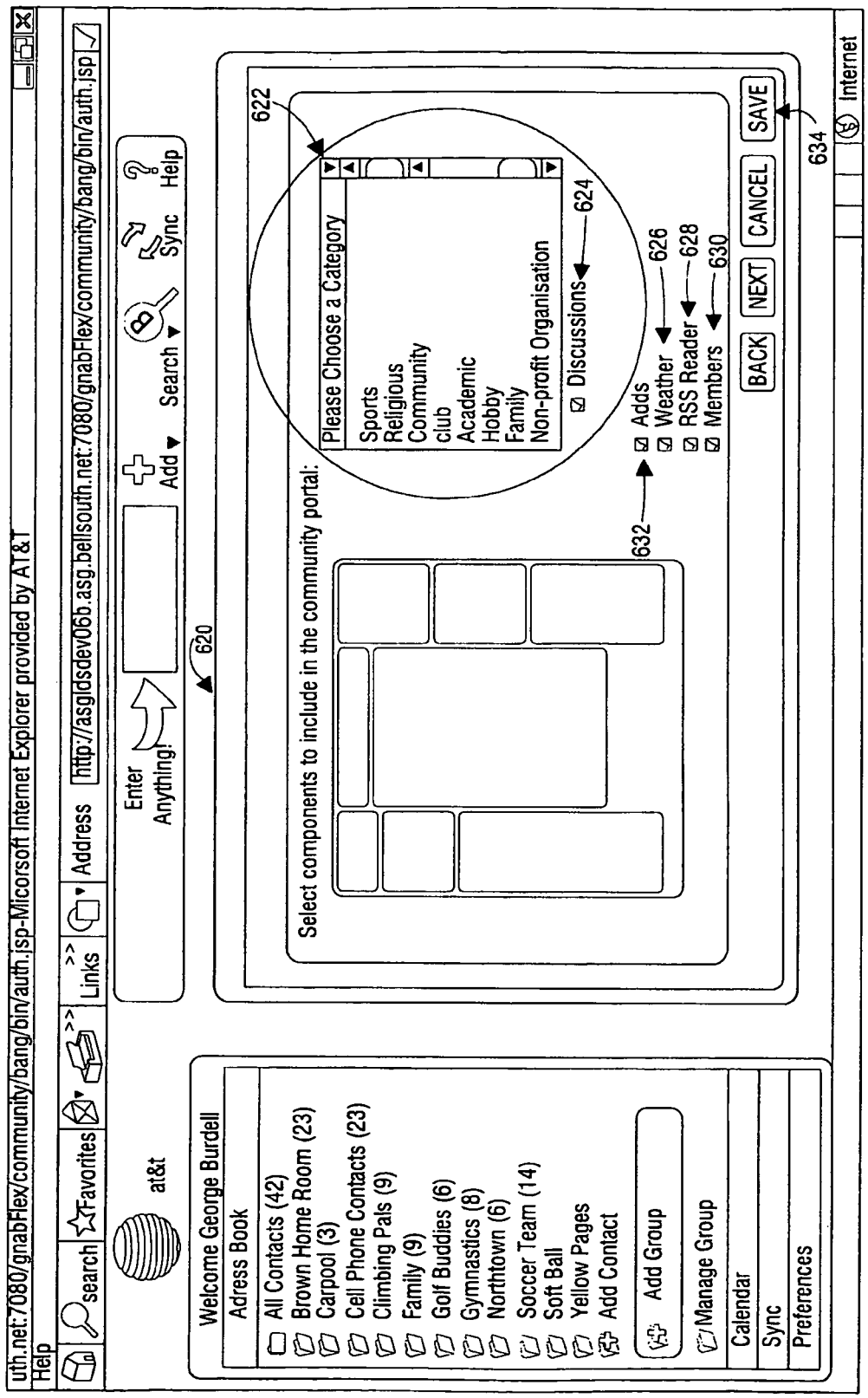
FIG. 6 depicts an exemplary embodiment of a components interface for providing additional customization options for the group community page, similar to the interface from FIG. 5.

FIG. 6 depicts an exemplary embodiment of a components selection window 620 for providing additional customization options for the group community page, similar to the interface from FIG. 5. As illustrated in the nonlimiting example of FIG. 6, a components selection window 620 may be provided. More specifically, with the selected layout form FIG. 5, the user may determine a category for the group community page via a category option 622.

While other predetermined and/or user selected category groups may be provided, a nonlimiting example of categories may include, sports, religious, community, club, academic, hobby, family, business, and non-profit organization.

Additionally included in the nonlimiting example of FIG. 6 are options for discussions 624, weather 626, a resource description framework (RDF) site summary (RSS) reader 628, members 630, and/or other options may be provided for inclusion in the group community page. More specifically, by selecting the weather option, a weather feed will be included in the group community page at a predetermined location. The weather feed may be customized such that the group community page displays current weather of a predetermined location, future weather of the predetermined location, current weather of a group calendar event location, future weather of a group calendar event location, and/or other data.

Similarly, an advertisement option 632 may be provided for including advertisements in the group community page. Depending on the particular configuration, the advertisement option 632 may or may not be user selectable. More specifically, the advertisement option 632 may be configured to allow a user to pay a fee (or otherwise provide compensation) to an entity that is providing the group community page. In receipt of the compensation, the providing entity may not include advertisements on the group community page for this group.

Additionally, in some embodiments, the user may not be provided with an option to not include advertisements on the group community page.

Accordingly, if the user selects the advertisement option 632 (or is not provided with the option to opt-out from receiving advertisements), the providing entity may determine advertisements that correspond with the selected group category from category option 622 to provide directed advertisements to that group community page. Similarly, the providing entity may determine other criteria for the group (e.g., events, event locations, etc.) to provide directed advertising. Also included is a save option 634 for saving the current settings.

Figure 7:
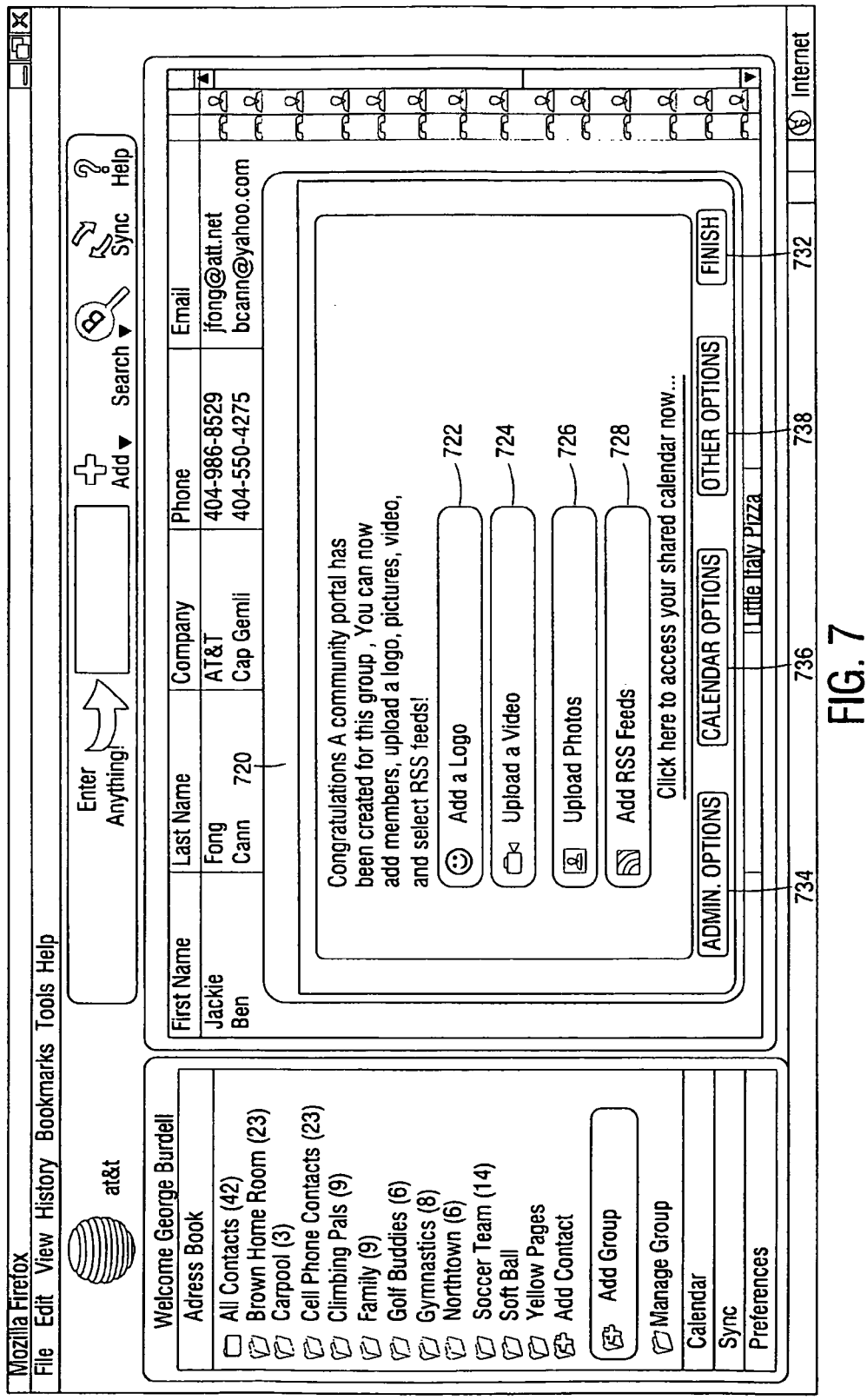
FIG. 7 depicts an exemplary embodiment of an upload interface for uploading data to a created group community page, similar to the interface from FIG. 6.

FIG. 7 depicts an exemplary embodiment of an upload window 720 for uploading data to a created group community page, similar to the components selection window 620, from FIG. 6. More specifically, an upload window 720 may be provided for uploading one or more different types of data to the group community page. As illustrated, a logo option 722 may be configured to facilitate uploading of a group logo for the group community page. The logo may be received as text, an image, video, audio, and/or any combination. Upon uploading the logo, the logo may be placed in a predetermined place on the group community page to identify of the group. Additionally, depending on the particular configuration, editing options may be provided to the user to change the location or appearance of the uploaded logo.

Similarly, a video option 724 may be provided in the upload window 720. The video option may be configured to facilitate upload of one or more videos for providing in a video portion of the group community page, as discussed in more detail below. A photos option 726 may facilitate upload of one or more photos for providing in a photos portion of the group community page. An RSS feeds option 728 may be included for facilitating upload of one or more RSS feeds. Also included is a shared calendar option 730 for viewing a shared calendar for the group.

Additionally included in the nonlimiting example of FIG. 7 are an admin options option 734, a calendar options option 736, and an other options option 738. More specifically, the admin options option 734 can provide one or more options regarding whether the community group will have an administrator, whether the user will be the administrator, and/or rights provided to the administrator. As a nonlimiting example, if the group is a soccer team, the user (who is the coach) might desire to also be the administrator, to easily indicate that a practice has been canceled. Similarly, as the administrator, the user may desire that other members (e.g., players, parents, and others) cannot override administrator settings, events, announcements, etc. Further, in at least one exemplary embodiment, the administrator can override personal member settings to view members' presence, location, etc.

Similarly, the calendar options option 736 may include one or more options for configuring the group community portal calendar. As a nonlimiting example, calendar options may include general visibility of individual events (e.g., whether a first member can see an event scheduled between a second member and a third member), default notification settings, member access to change an event (which may also correspond to the administrator options, discussed above), and/or other options. The other options option 738 may be configured to provide miscellaneous options that are not otherwise provided. A finish option 732 may be configured to complete creation of the group community page.

Figure 8:
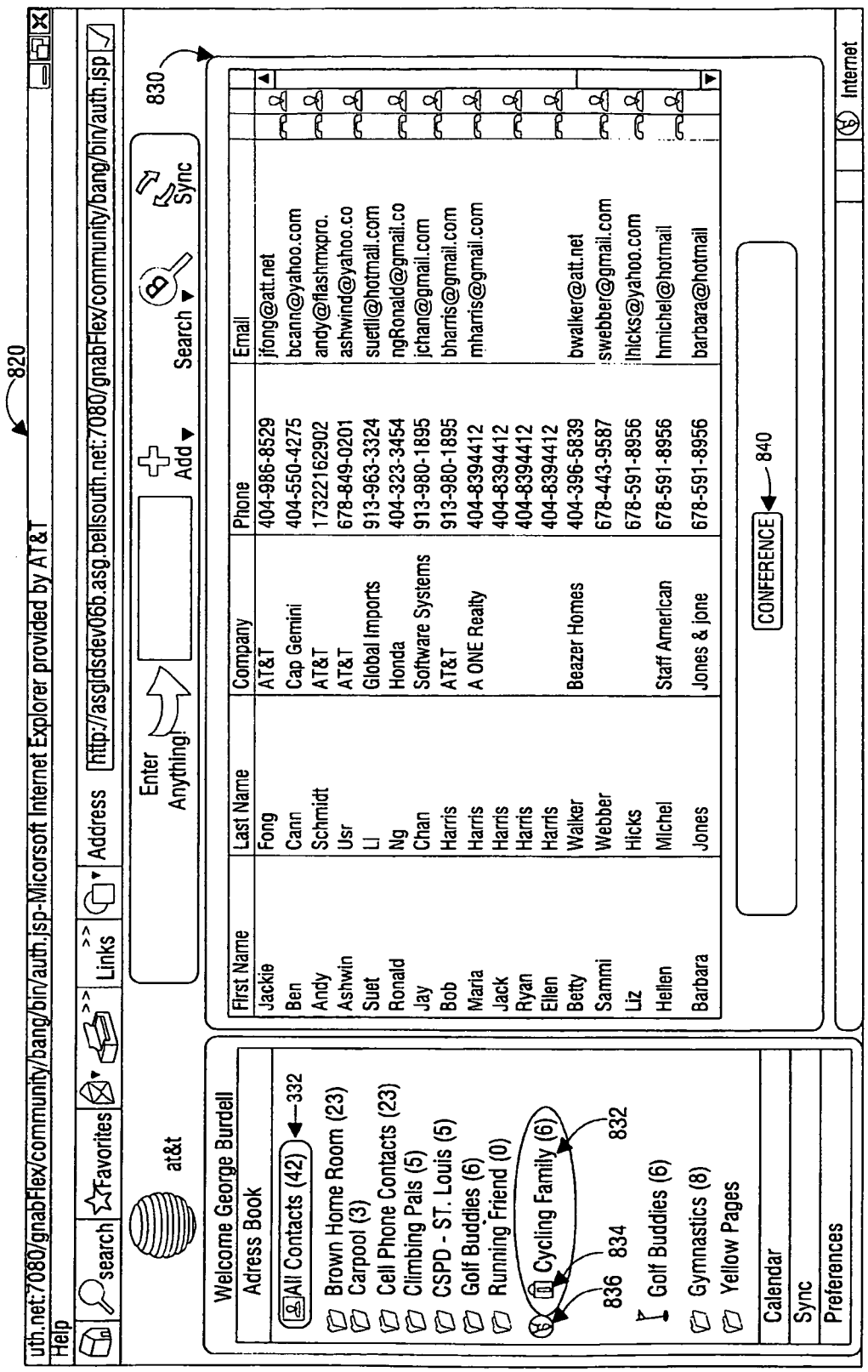
FIG. 8 depicts an exemplary embodiment of an address book interface, further illustrating a plurality of groups, similar to the interface from FIG. 7.

FIG. 8 depicts an exemplary embodiment of an address book interface 820, further illustrating a plurality of groups, similar to the upload window 720 from FIG. 7. As illustrated in the nonlimiting example of FIG. 8, the address book interface 820 may be configured to provide a contacts listing 830 that is configured to provide all contacts of a user. In the contacts listing 830, contact information for one or more contacts may be provided, as well as presence information associated with one or more addresses of the contacts.

As discussed above, in the all contacts heading 332 (FIG. 3) are listed one or more groups for this user. The groups may be listed with one or more signifiers (834, 836). More specifically, as illustrated in FIG. 8, the cycling friends group 832 is associated with a first signifier 834 to indicate that access is restricted to members of the group. Additionally, a second signifier 836 listed with the cycling friends group 832 indicates that this group is associated with a group community page. By selecting the first signifier 834, the user may be provided with authentication information. By selecting the second signifier, the group community page may be launched.

Additionally included in the nonlimiting example of FIG. 8 is a conference option 840. More specifically, as a nonlimiting example, if a user wishes to communicate with one or more contacts, the user can drag and drop the contacts to the conference option 840. The user can then select the conference option to facilitate the communication. As described below with regard to FIGS. 13 and 14, the user can then indicate an originating address prior to connecting the communication.

Similarly, in at least one exemplary embodiment, the user can select one or more of the contacts in the contacts listing 830 (e.g., via a left mouse click while holding a "ctrl" key). The user may then indicate a desire to communicate with the selected contacts (e.g., via a right mouse click and a selection a command "connect"). The communication may then be facilitated as described above.

Further, at least one exemplary embodiment may provide the user the option to simply right click (or otherwise select) a group. Upon selecting the group, all (or a predetermined subset) of members are contacted, as described above.

Similarly, if the user desires to send a message (e.g., an email, instant message, SMS message, etc.) the user may take similar actions. Regardless of the actions taken, in at least one embodiment, the message is sent to the contact's address where that contact is currently present (and/or based on predefined preferences of the contact).

Figure 9:
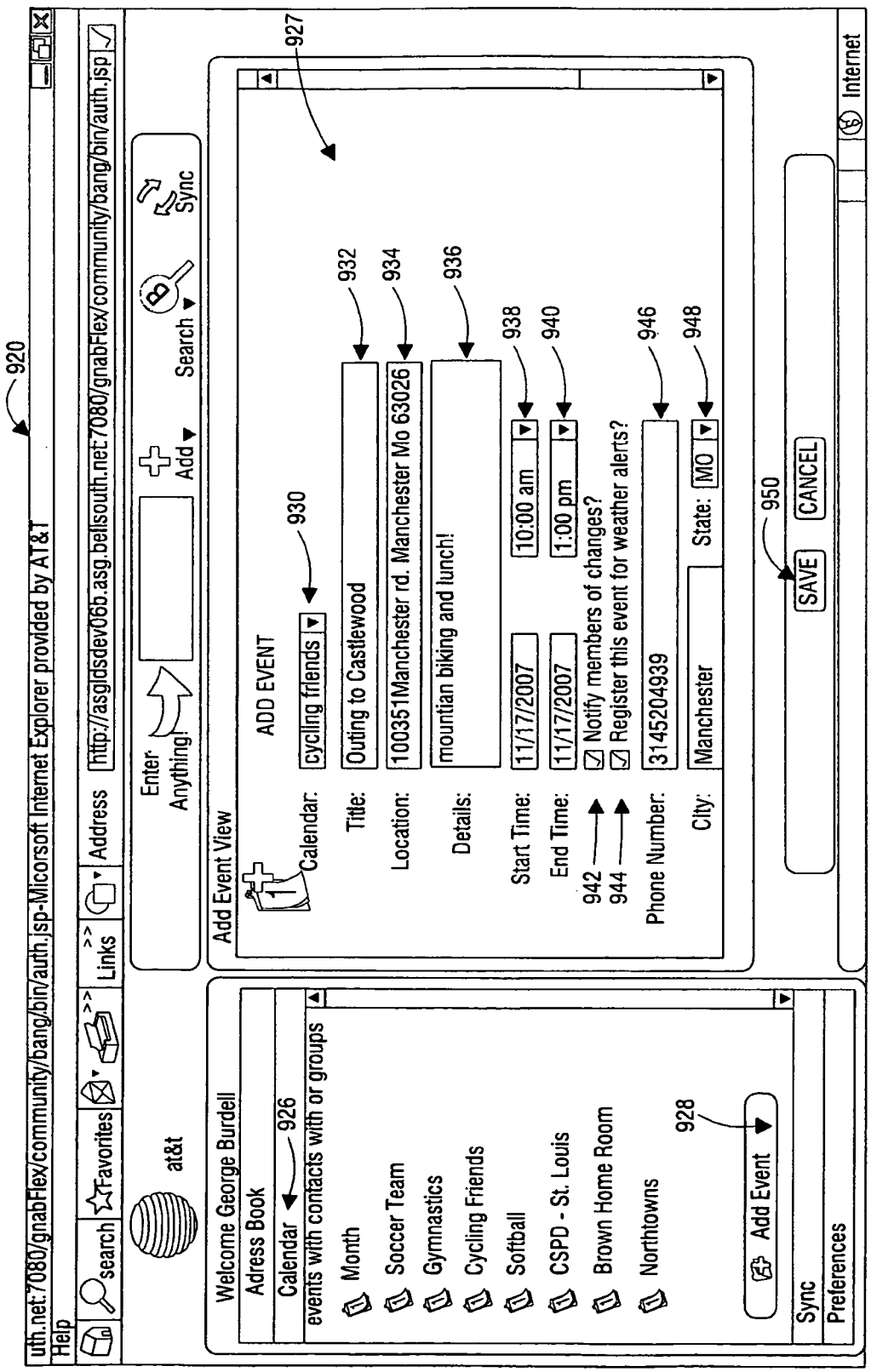
FIG. 9 depicts an exemplary embodiment of a calendar interface, further illustrating creation of an event, similar to the interface from FIG. 8.

FIG. 9 depicts an exemplary embodiment of a calendar interface 920, further illustrating creation of an event, similar to the address book interface 820 from FIG. 8. More specifically, the calendar interface 920 may include a calendar menu 926, with sub-menus for month, as well as for one or more of the groups. Additionally included is an add event option 928 for adding an event to the calendar. Further, options to provide a weekly view, daily view, etc. of one or more of the calendars may also be provided.

In response to a selection of the add event option 928, an add event form 927 may be provided. More specifically, the add event form 927 may include a calendar selection option 930 to allow a user selection of whether and to which group calendar the event should be listed. By selecting the cycling friends group, the event will be saved in the cycling friends calendar and, depending on the particular nonlimiting example, provided in the cycling friends group community page.

Additionally included in the add event form 927 is a title field 932, a location field 934, a details field 936, a start time field 938, and an end time field 940. Further, a notify of changes option 942 is included and may be configured to determine whether changes to this event will be sent to other members of the group. As a nonlimiting example, if the group is a soccer team and the event is a practice, the coach may wish to notify members of the group that the practice time has changed; the practice has been canceled, etc. Similarly, a weather notification option 944 may also be included for determining whether group members will be alerted of inclement weather around the time of the event and around the location of the event. Additionally included are a phone number field 946 and a city and state field 948. Changes to the event may be saved by selection of the save option 950.

One should note that, depending on the particular configuration, each group may have a separate calendar. The calendars may be accessed via the calendar menu 926 and/or, depending on the particular group, via the group community page associated with that group. Additionally, one or more of the group calendars may overlay a general group calendar for that particular user, thus providing a combined calendar for general individual events (e.g., those not associated with a group), as well as group events.

One should also note that reminder options may also be provided for the created event. More specifically, in at least one embodiment, the user may be provided an option to indicate when and how a reminder will be presented to the user for this event. However, some embodiments may be configured to automatically determine when to provide the user with the reminder. As a nonlimiting example, in some embodiments, a determination can be made of the user's location at a given point in time (e.g., via a positioning system in a device to which the user is present). Based on the determined user location and the indicated location of the event, a determination can be made regarding the approximate amount of time it will take the user to arrive at the indicated location. A reminder time can then be calculated from this estimated time. The reminder can then automatically be sent at the calculated time (and/or a predetermined time before the calculated time).

Figure 10:
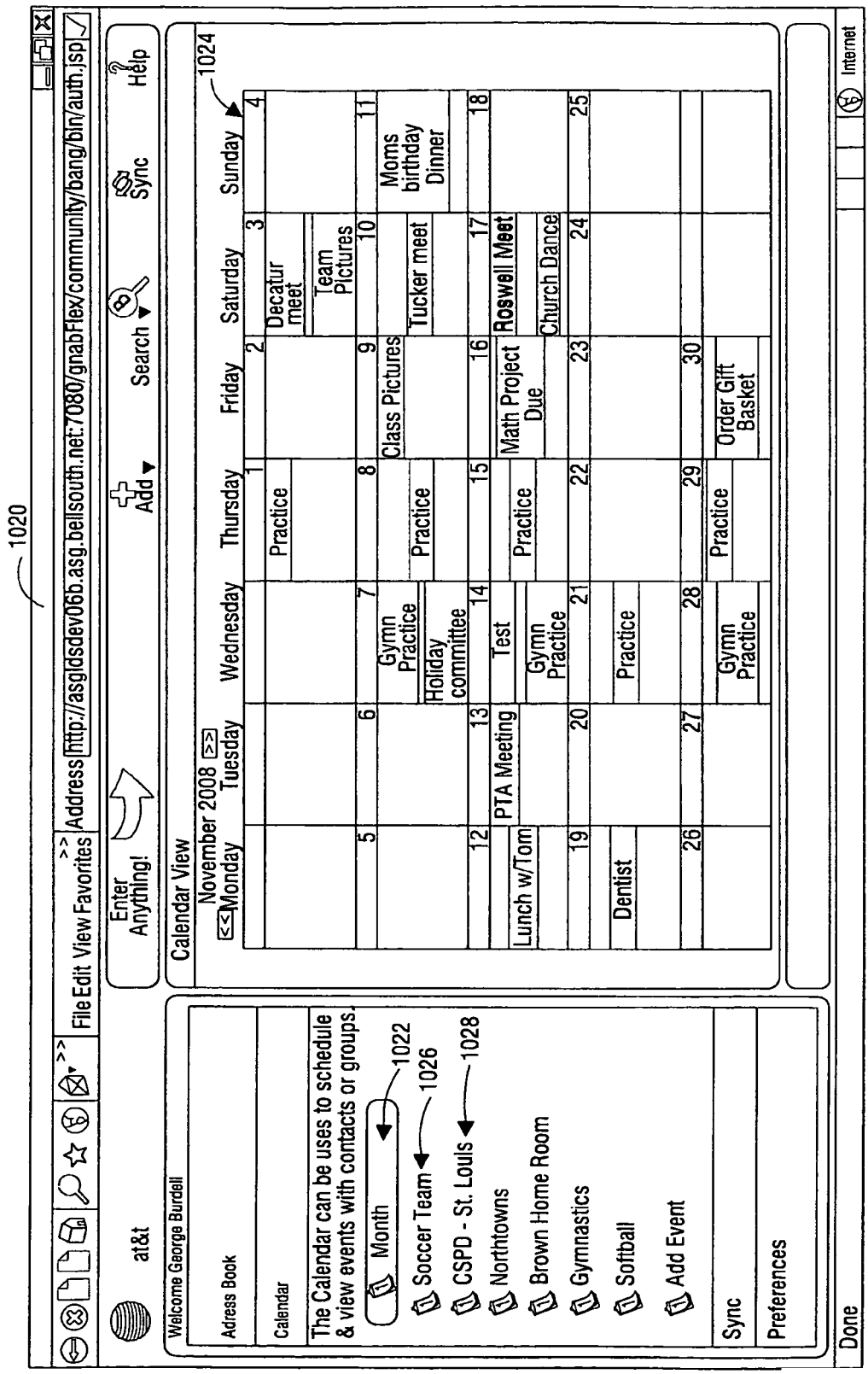
FIG. 10 depicts an exemplary embodiment of a month view calendar interface, illustrating calendar overlay from a plurality of different calendars, similar to the interface from FIG. 9.

FIG. 10 depicts an exemplary embodiment of an address book calendar interface 1020 (also referred to as a local calendar interface), illustrating calendar overlay from a plurality of different calendars, similar to the calendar interface 920 from FIG. 9. As illustrated in the nonlimiting example of FIG. 10, the view calendar interface 1020 may include a month sub-menu 1022 for displaying a calendar interface 1024. More specifically, the calendar interface 1024 may display events from the general user calendar, as well as from one or more of the group calendars. Depending on the particular configuration, user options may be provided for selecting which group calendars are displayed (and/or whether individual events or group events are displayed). Additionally, the groups 1026 may each be associated with a different color, shading, and/or other marking. Thus, the "Practice" event on Thursday, November 1, is associated with the soccer team group. Other groups are also represented in the calendar interface 1024.

Figure 11:
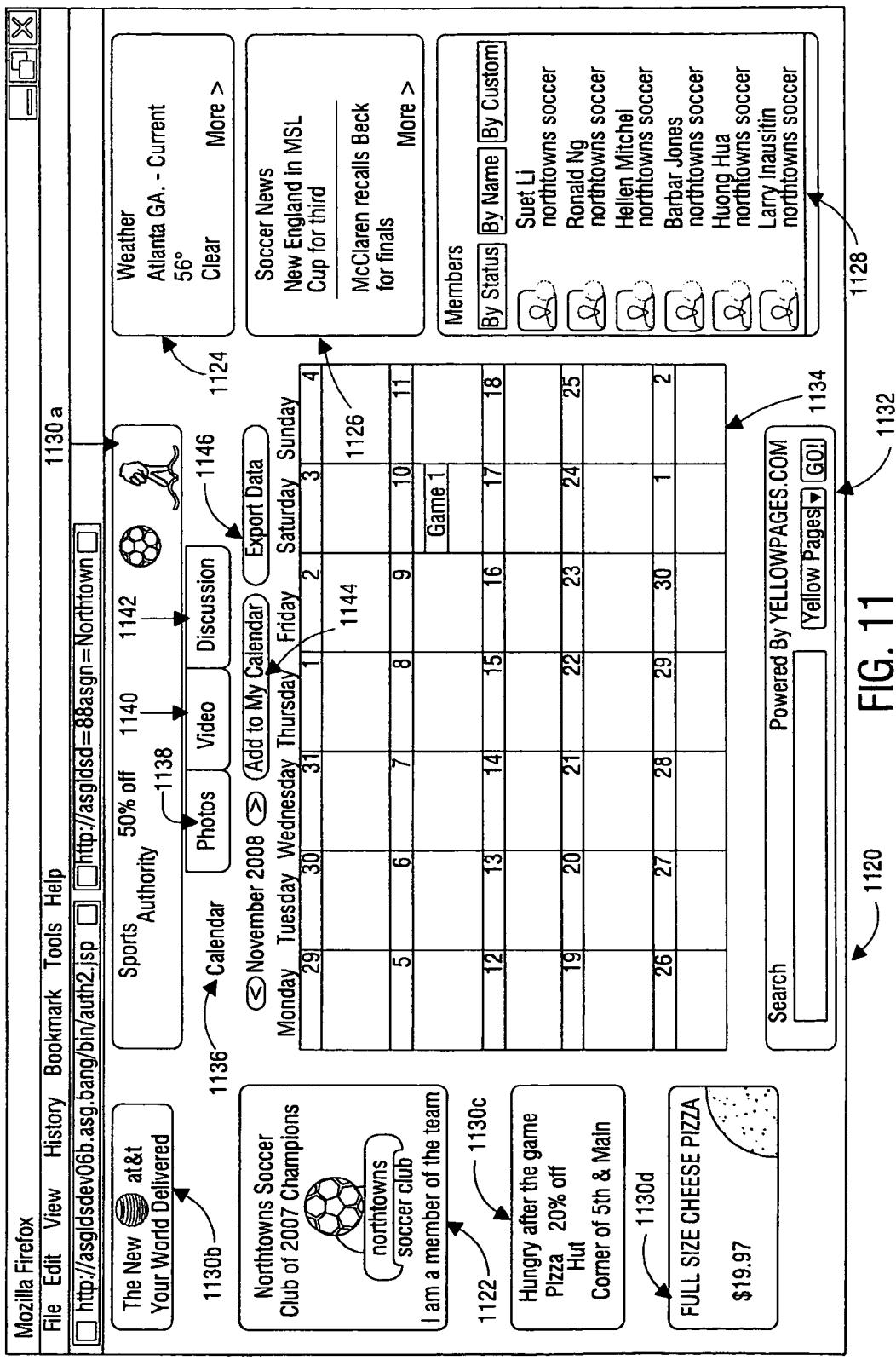
FIG. 11 depicts an exemplary embodiment of a community portal interface for providing event data to one or more group members, similar to the calendar interface from FIG. 10.

FIG. 11 depicts an exemplary embodiment of a community portal interface 1120 for providing event data to one or more group members, similar to the view calendar interface 1020 from FIG. 10. As illustrated, the community portal interface 1120 may be configured as discussed with regard to FIGS. 3-7. More specifically, the community portal interface 1120 may be provided by a third party website and may be configured according to the specified layout from FIG. 5 and the options selected from FIG. 6. Additionally, a group logo 1122 may be placed in the community portal interface 1120. A weather area 1124, an RSS feed 1126, and a members listing 1128 may also be provided.

Also included in the members listing 1128 are a listing one or more of the group members, as well as contact information, subscription information, etc. for the listed group members. From the members listing 1128, the user can contact one or more of the group members via a plurality of different actions. As a nonlimiting example, a user may select one or more of the members in members listing 1128 (e.g., via a left mouse click while holding a "ctrl" key). The user may then indicate a desire to contact the selected members (e.g., via a right mouse click and a selection a command "connect"). Other configurations may provide that the user simply drag and drop members from the members listing 1128 into a designated area. Other configurations are also contemplated.

Also included in the community portal interface 1120 are advertisements 1130*a*-1130*d*. More specifically, the advertisements 1130 may be directed advertisements based on calendar events, group category, group members (e.g., if there are multiple doctors in the group, advertisements may be directed to products that doctors prefer), geographic location, etc. The community portal interface 1120 may also include a search bar 1132 for providing additional searching options, as well as providing additional revenue for the providing entity.

In a center portion of the community portal interface 1120 is a group calendar interface 1134 that corresponds to a calendar tab 1136. Also included are a photos tab 1138, a video tab 1140, and a discussion tab 1142. The group calendar interface 1134 may also include group events that have been scheduled for group members and/or the group as a whole. More specifically, depending on the particular embodiment, a group member can create an even that will be included in the group calendar. Such an event creation may be facilitated by a local application interface such as illustrated in FIGS. 9 and 10 by a web interface, such as the web interface from FIG. 11).

Again, depending on the particular configuration, a member of the group can create only individual events for the calendar, whereas the group administrator (if the group has an administrator) can create individual events, as well as group events. As a nonlimiting example, if the group is a soccer team and the administrator is the coach of that team, the coach may be designated as the group administrator. Accordingly, the coach (administrator) can schedule individual events (e.g., meeting with Bobby), as well as group events (e.g., game against the Flyers). In this nonlimiting example, group members (and nonmembers) who are not the administrator can only create individual events (e.g., meeting with Coach), but not group events. Similarly, some embodiments may allow all members of the group to add, amend, and/or delete both individual and group events from the calendar.

Also included in the nonlimiting example of FIG. 11 is an add to my calendar option 1144 and an export data option 1146. More specifically, depending on the nonlimiting example, if a user has an account with the community portal provider (e.g., the ISP or other entity), by selecting the add to my calendar option 1144, the entries from the community portal interface 1120 will automatically be configured for display on a local calendar, such as the calendar from FIG. 10. Similarly, if the member is not an account holder with the community portal provider, the user may select the export data option 1146. By selecting the export data option 1146, a file may be exported to the client device 102 for importation into a local calendar.

Figure 12:
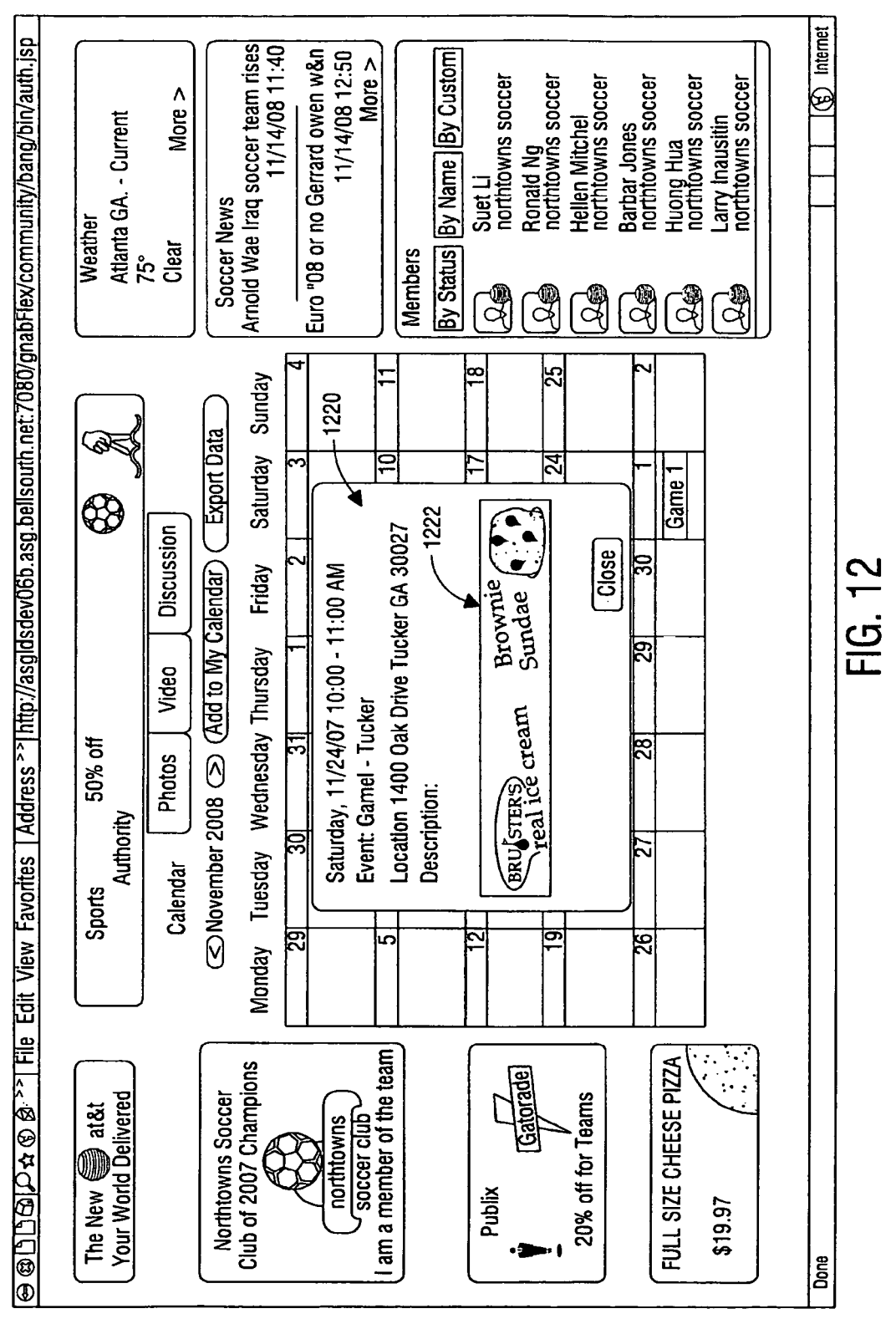

FIG. 12 depicts an exemplary embodiment of an event interface 1220, illustrating an event occurrence reminder, similar to the community portal interface 1120 from FIG. 11. As illustrated in the nonlimiting example of FIG. 12, the event interface 1220 may correspond to a reminder on the calendar of the selected group. The event interface 1220 may include data as provided in the event form 927 from FIG. 9 (and/or data provided for an event created via the community portal interface 1120). Additionally, a directed advertisement 1222 may be provided that corresponds to the event, event location, and/or other data.

One should note that while the event interface 1220 is provided to the user while logged onto the community portal interface, some embodiments may be configured such that the user is informed of the event via one or more of the addresses associated with the group. As a nonlimiting example, the user may designate a cell phone number as the primary address to the group. Accordingly, the event notification (displayed as the event interface 1220) may be provided as a text message, voice message, video message, etc. to the cell phone number. Again, depending on the determined user settings, other addresses may also be alerted. Similarly, in at least one embodiment, if it is determined (via global positioning or other positioning systems) that the user is currently located at the event at the designated time, the event notification may be prevented from presentation to the user.

Figure 13:
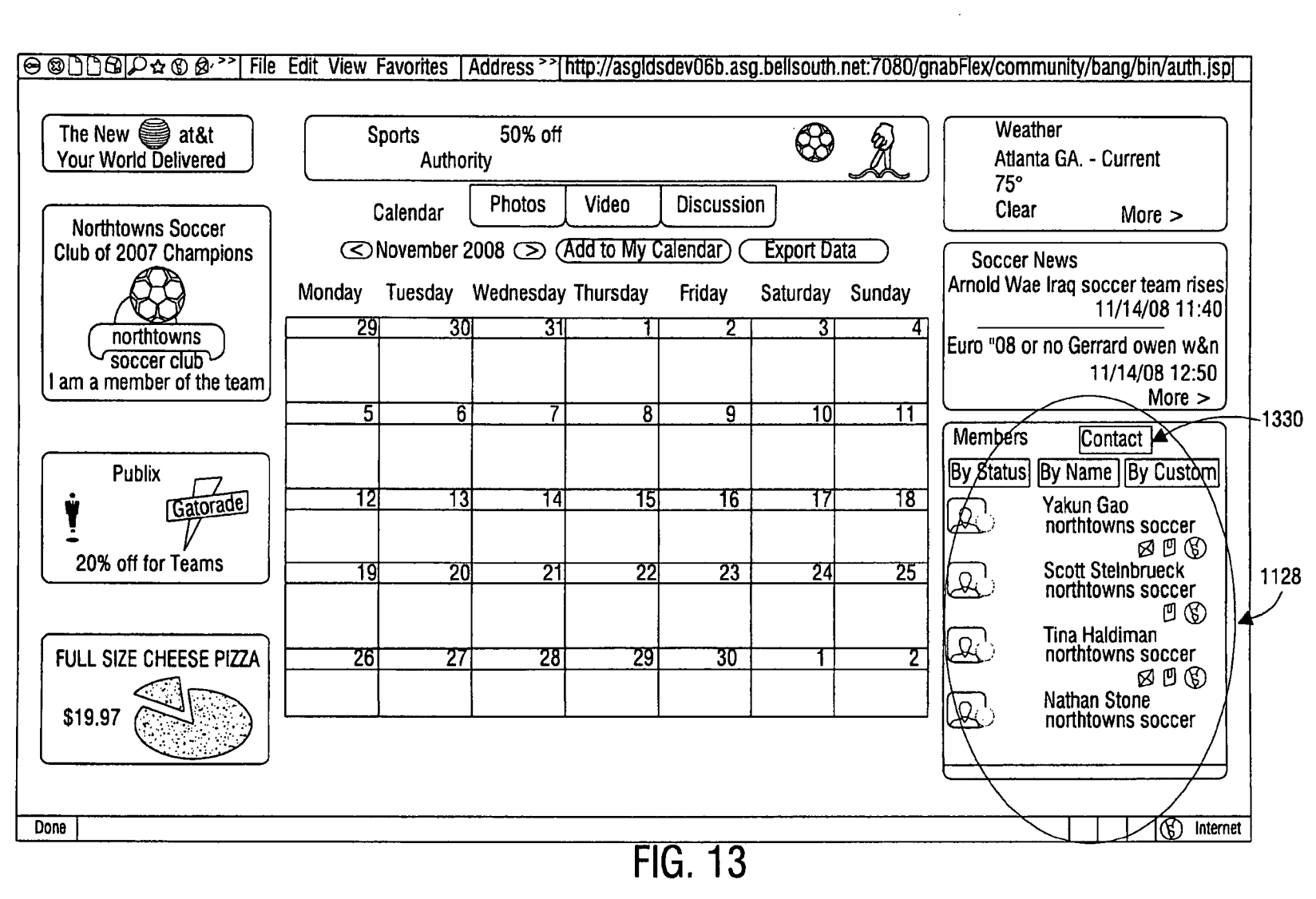

FIG. 13 depicts an exemplary embodiment of the community portal interface 1120, from FIG. 11, further illustrating communications mediums available for group members. As illustrated in the nonlimiting example of FIG. 13, the community portal interface includes the members listing 1128, where the members may be listed by status, name, and/or according to a custom order. As discussed above, the members listing 1128 may include a listing of contact addresses for each of the listed members. As a nonlimiting example, Yakun Gao may be reached by email and/or cellular phone (indicated by the highlighted envelope and cell phone icon), but is currently unavailable via text message and is not currently logged onto the community portal (indicated by the grayed text bubble and globe icon). Accordingly, to begin a communication with one or more of the members, the user can drag and drop one or more icons corresponding to those members into the contact box 1330. Once all desired contacts have been dropped into the contact box 1330, the user can select the contact box 1330 to begin the communication. Similarly, as discussed above, the user can select a contact and right click to initiate communication.

Similarly, if the user desires to send a message (e.g., an email, instant message, SMS message, etc.) to a member (and/or nonmember) the user may take similar actions. Regardless of the actions taken, in at least one embodiment, the message is sent to the contact's address where that contact is currently present (and/or based on predefined preferences of the contact).

Additionally, depending on the particular configuration, the user can determine how to contact the selected members and/or the portal logic 299 can determine how to contact the selected members. More specifically, in at least one exemplary embodiment, the user can select the members (and/or nonmembers) that he/she wants to contact. Upon selecting contact box 1330, the user may be prompted regarding the mechanism for contacting the selected members (e.g., cell phone, email, short messaging system (SMS) message, instant message, etc.). Similarly, some embodiments may be configured such that the user can select the members (and/or nonmembers) to contact, and the portal logic can determine the best technique for contacting the selected members (and/or nonmembers). As a nonlimiting example, the determination may be made on presence and/or user preferences selected by that member (and/or nonmember).

Figure 14:
FIG. 14 depicts an exemplary embodiment of a click-to-conference interface, which may be presented for participating in a conference call, similar to the interface from FIG. 13.

FIG. 14 depicts an exemplary embodiment of a click-to-conference interface, which may be presented for participating in a conference call, similar to the interface from FIG. 13. As illustrated in the nonlimiting example of FIG. 14, in response to selection of the contact box 1330 (and/or otherwise indicating a desire to conference members and/or nonmembers of a group), a prompt box 1420 may be presented for designating an originating address for the communication. More specifically, upon entering the desired originating address, the communication can be facilitated between the originating address and the designated members/nonmembers. As a nonlimiting example, if the user enters a cell phone number as the originating address, the cell phone may ring. Upon answering the cell phone, the user will be connected to the members/nonmembers designated for the conference call. Additionally, while in the nonlimiting example of FIG. 14, the address is designated as a telephone number, the address may include a telephone number (including cell phone number), an email address, an instant messaging address, and/or other address.

Figure 15:
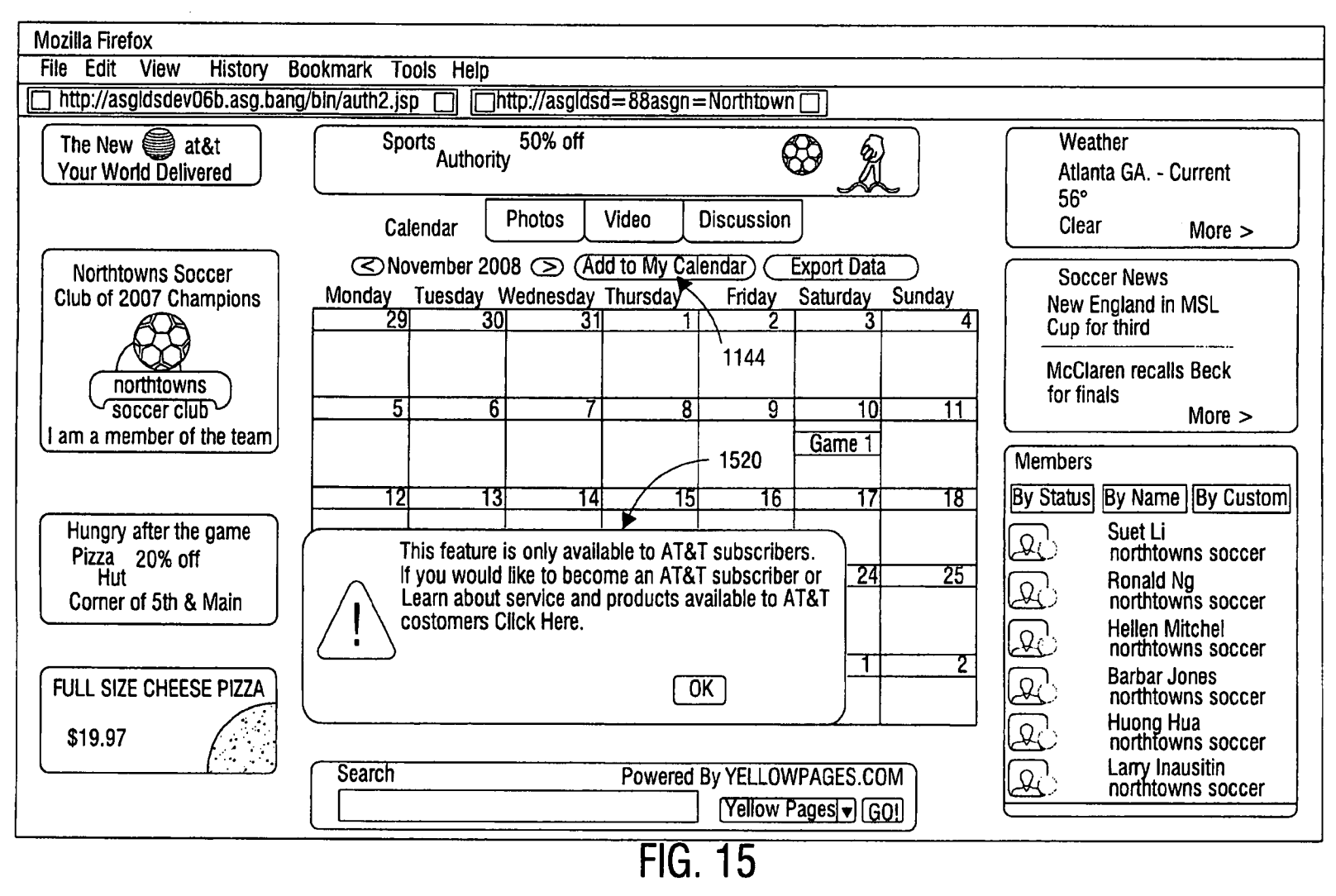

FIG. 15 depicts an exemplary embodiment of the community portal interface 1120 from FIG. 11, further illustrating a dialog box that may be presented, in response to selection of the add to my calendar option 1144. As illustrated in the nonlimiting example of FIG. 15, if a group member (or nonmember) is not an account holder of the community portal system and the member (or nonmember) selects the add to my calendar option 1144 (FIG. 11), the member (or nonmember) may be presented with the popup window 1520 indicating that such a feature is available only to account holders. Similarly, depending on the particular configuration, similar popup windows may be presented for other options.

Figure 16:
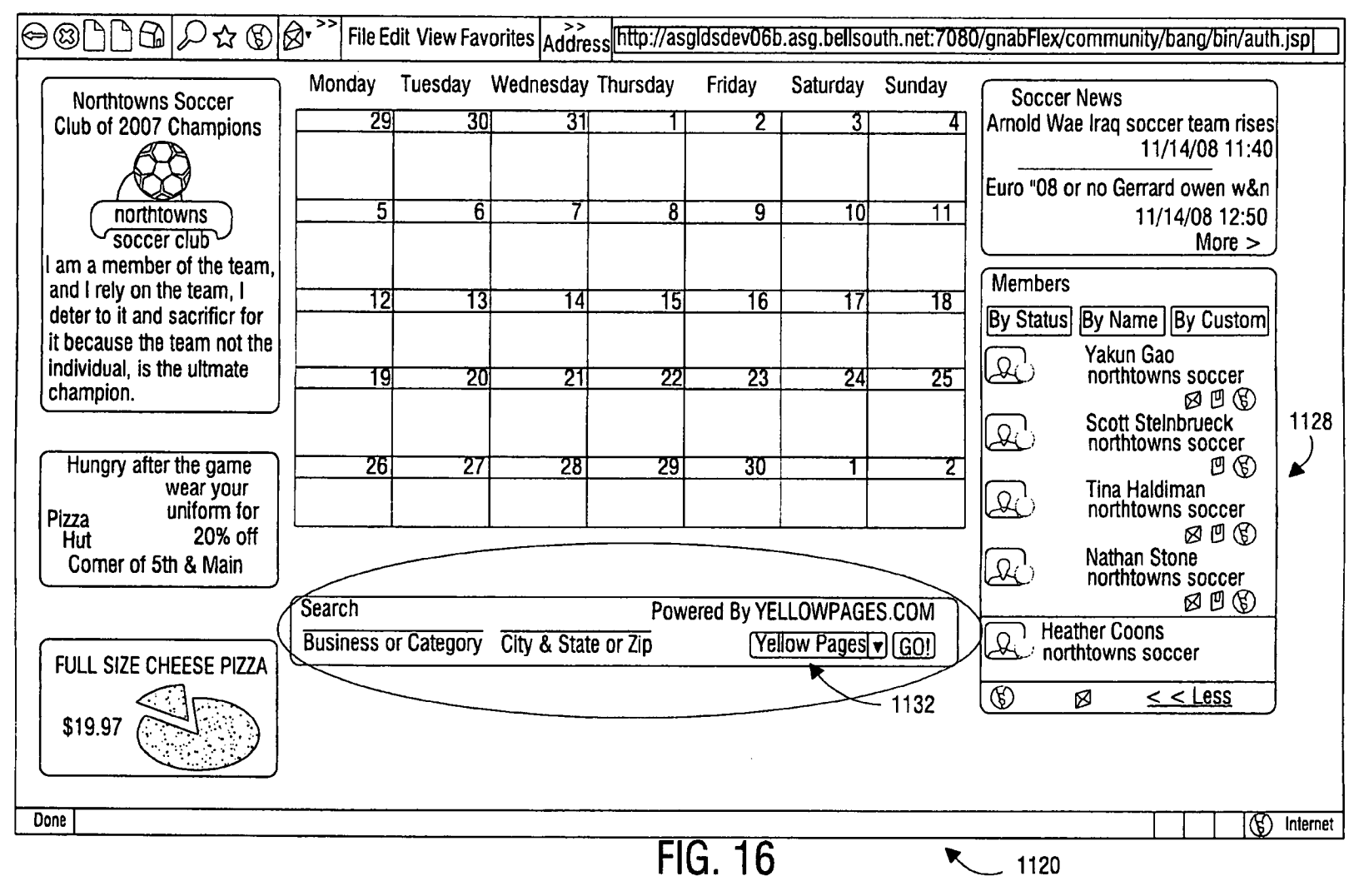

FIG. 16 depicts an exemplary embodiment of the community portal interface 1120 from FIG. 11, further illustrating searching capabilities that may be utilized. As illustrated in the nonlimiting example of FIG. 16, the search bar 1132 may be configured to allow users search options for searching the community portal and/or the Internet, as a whole. Additionally, as agreements can be negotiated with the searcher, the search bar 1132 may be utilized as an additional revenue producer for the community portal.

Figure 17:
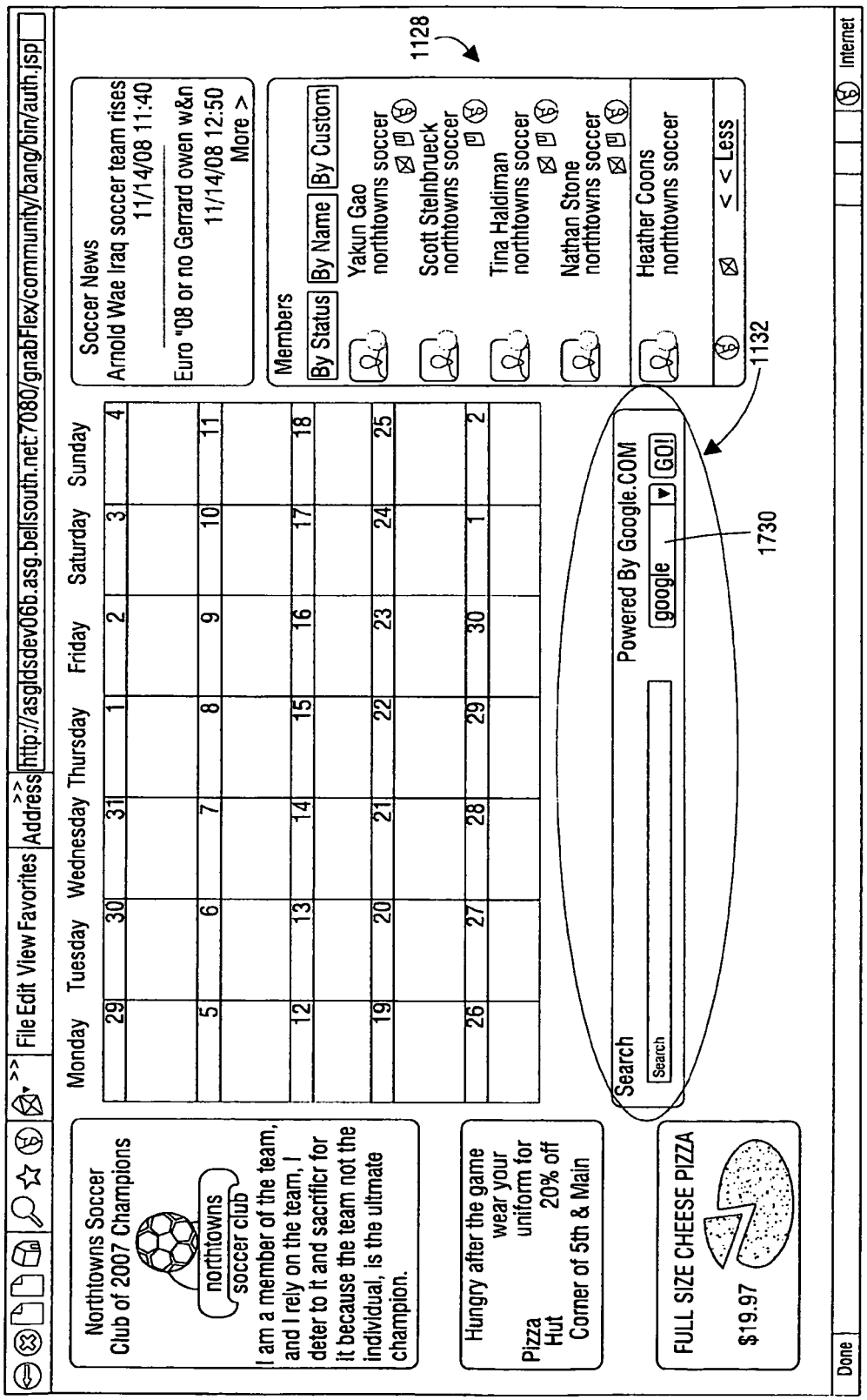
FIG. 17 depicts an exemplary embodiment of the community portal interface from FIG. 11, further illustrating an additional nonlimiting example of searching capabilities that may be utilized.

FIG. 17 depicts an exemplary embodiment of the community portal interface 1120 from FIG. 11, further illustrating an additional nonlimiting example of searching capabilities that may be utilized. As illustrated in the nonlimiting example of FIG. 17, the search bar 1132 may also include a search authority option 1730 for selecting from a plurality of different search authorities.

Figure 18:
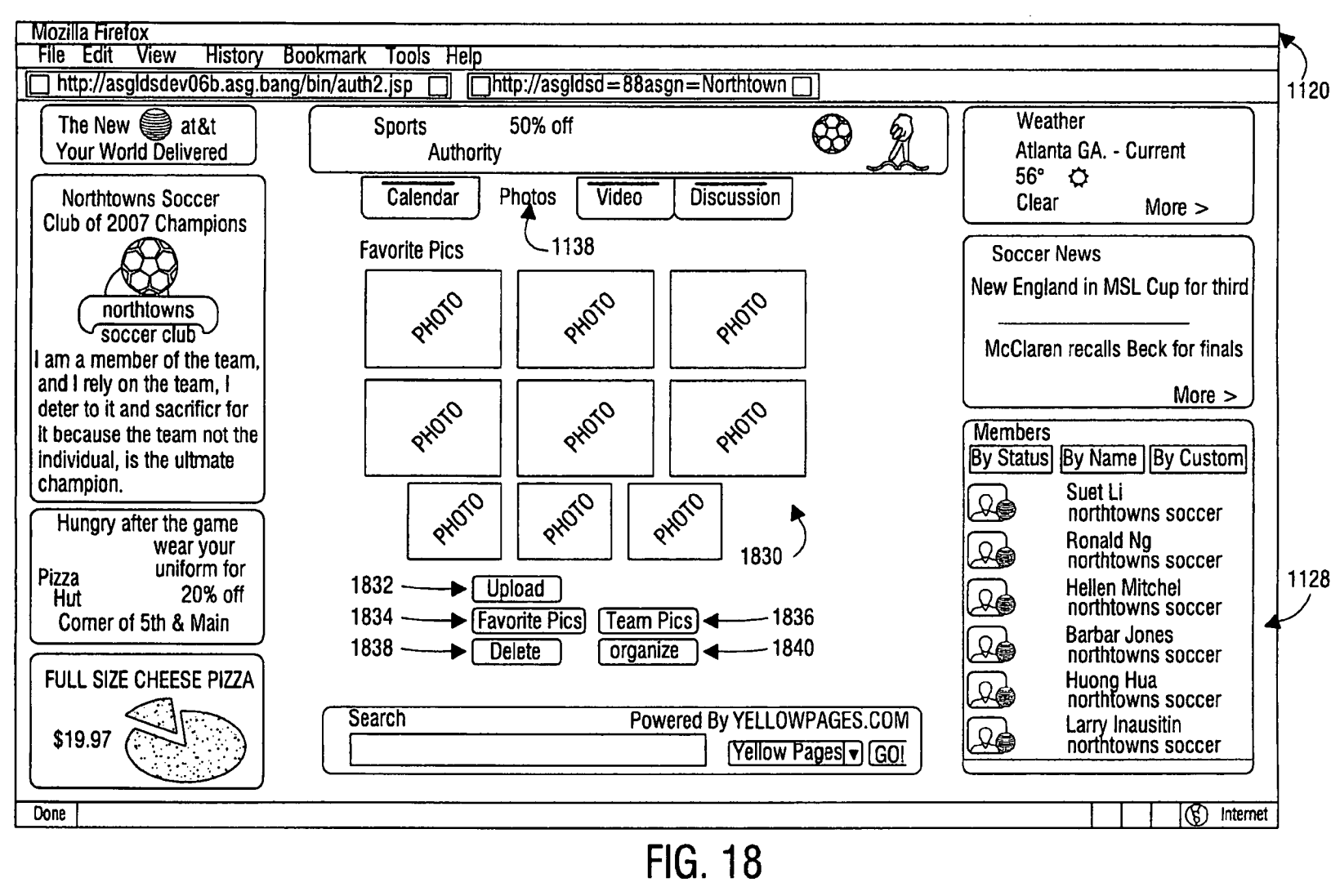

FIG. 18 depicts an exemplary embodiment of a photos section of the community portal interface 1120 from FIG. 11. As illustrated in the nonlimiting example of FIG. 18, the community portal interface 1120 includes the photos tab 1138, which, when selected, can provide photos 1830 associated with the group, as well as options to add, delete, amend, and/or organize photos. While in at least one embodiment, the photos 1830 may only be uploaded by the administrator, some embodiments may be configured such that any member of the group (and/or nonmembers) can upload photos via selection of an upload option 1832. Similarly, a favorite pics option 1834 and team pics option 1836 can provide other photos associated with the group. Additionally, photos can be deleted via selection of a delete option 1838. Photos may be organized via selection of an organize option 1840.

Figure 19:
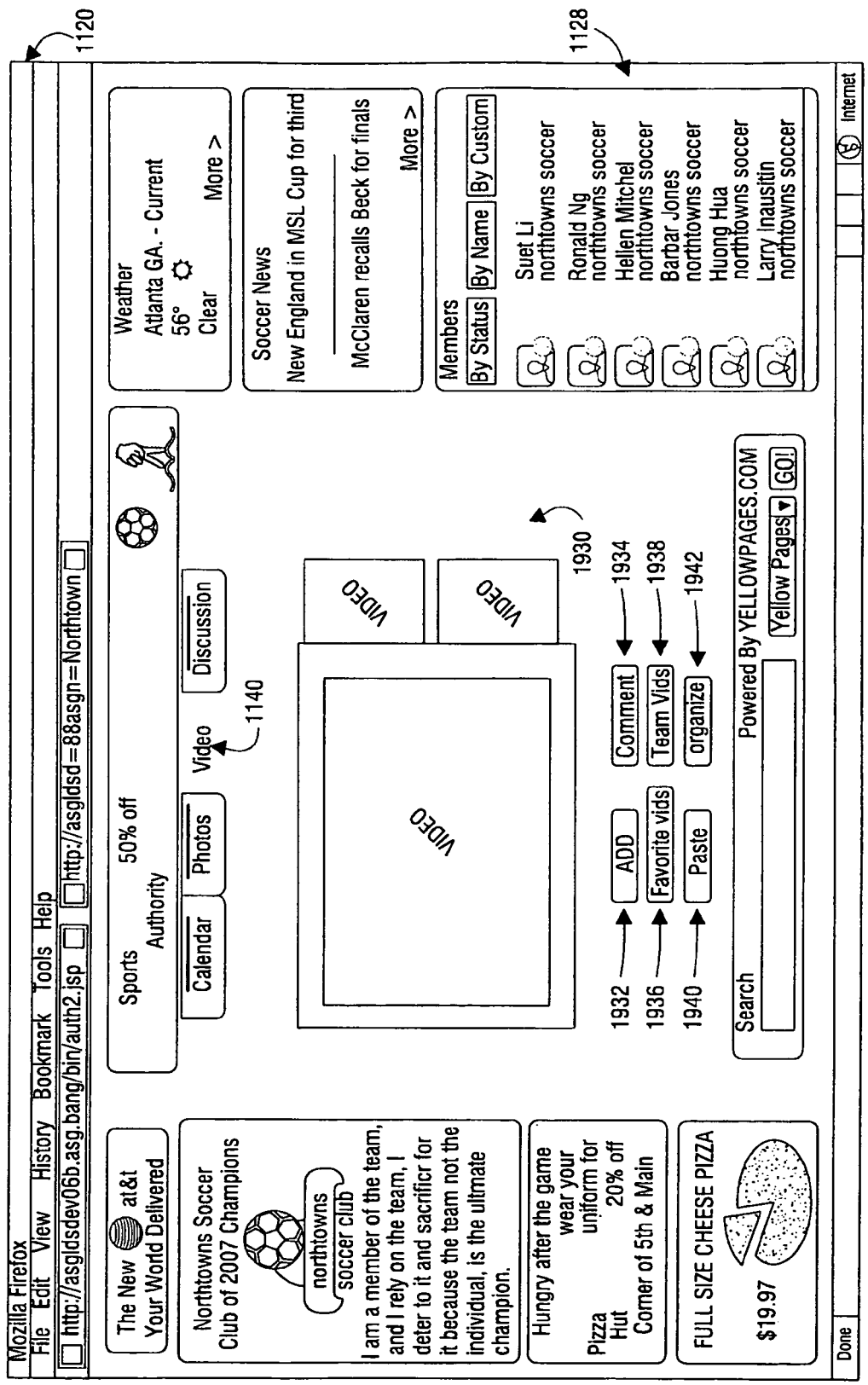
FIG. 19 depicts an exemplary embodiment of an expanded video, which may be provided in the photos section of the community portal interface, similar to the interface from FIG. 18.

FIG. 19 depicts an exemplary embodiment of an expanded video, which may be provided in the photos section of the community portal interface 1120, similar to the interface from FIG. 18. As illustrated in the nonlimiting example of FIG. 19, the community portal interface 1120 includes the video tab 1140 for providing one or more videos 1930. Additionally included in the nonlimiting example of FIG. 19 is an add option 1932 for adding videos, a comment option 1934 for commenting on uploaded videos, as well as a favorite vids option 1936 and a team vids option 1936 for viewing videos of different categories. Also included is a delete option 1940 and an organize option 1942.

Figure 20:
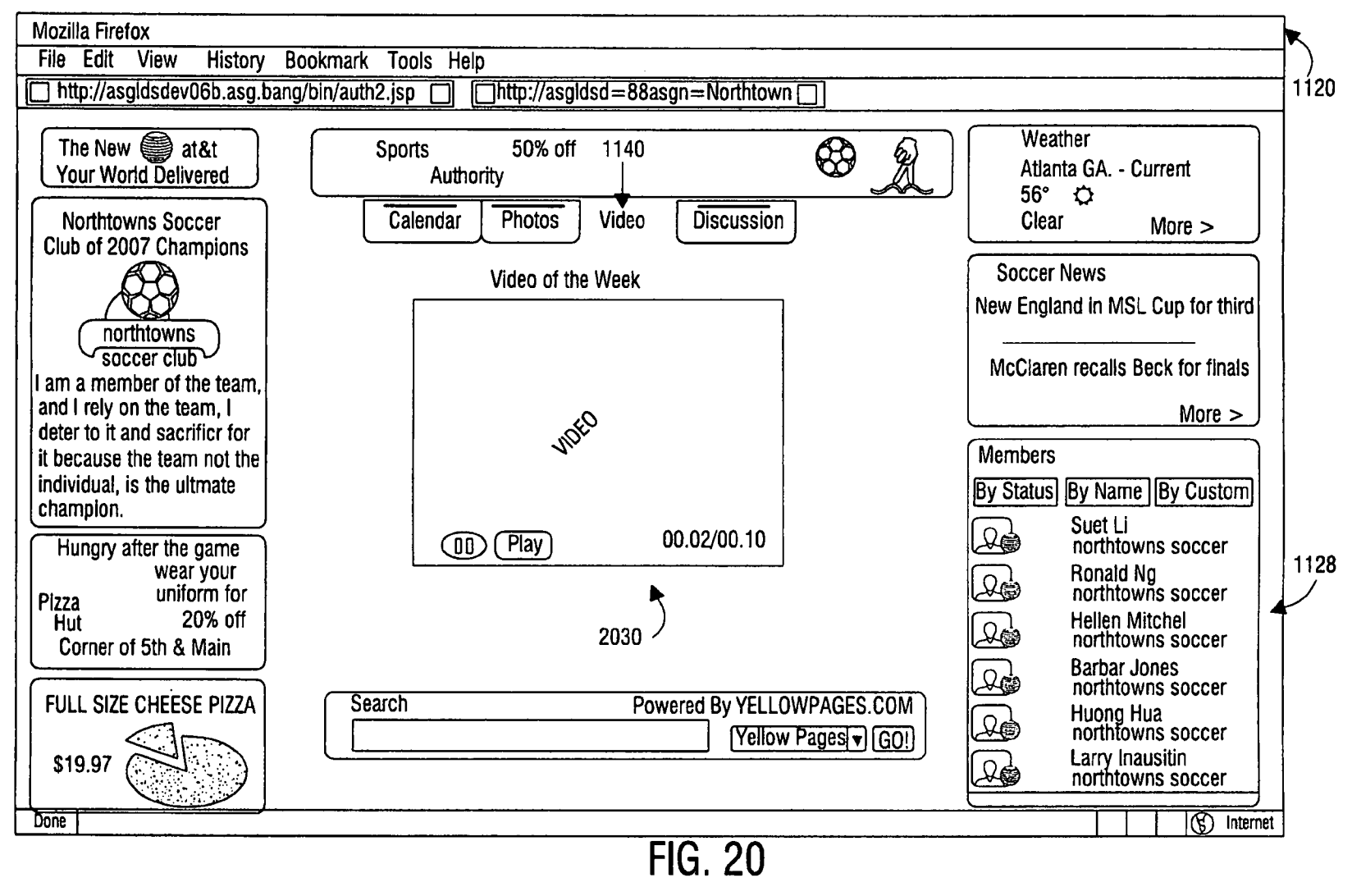

FIG. 20 depicts an exemplary embodiment of a video section of the community portal interface 1120 from FIG. 11. As illustrated in the nonlimiting example of FIG. 20, the community portal interface 1120 may be configured to provide a video of the week 2030 under the video tab 1140. More specifically, the video of the week may be determined by the group administrator, via a vote of group members and/or via other ways. Additionally, the video of the week may be accessed via the favorite vids option 1936, from FIG. 19.

FIG. 21 depicts an exemplary embodiment of a discussion section of the community portal interface from FIG. 11. As illustrated in the nonlimiting example of FIG. 21, the community portal interface 1120 also includes a discussion board 2130 that may be accessed by selecting the discussion tab 1142. In the discussion board 2130 members (and/or nonmembers) may post topics for discussion. Members (and/or nonmembers) can add message threads via selection of new topic option 2132. Additionally, members (and/or nonmembers) can view message threads by selecting an existing message thread 2132a-2132i. Similarly, members (and/or nonmembers) can search message threads via option 2134.

Figure 22:
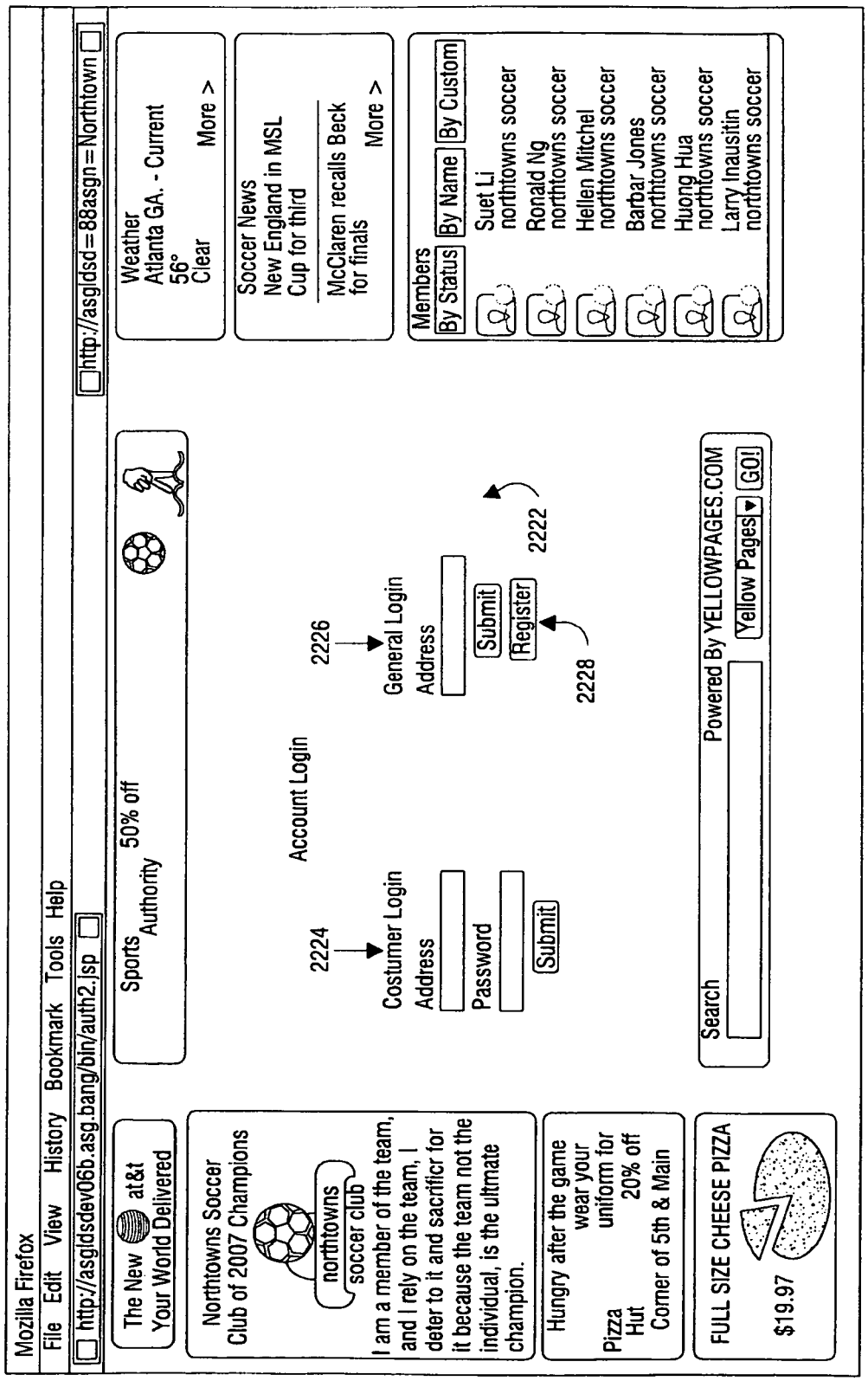
FIG. 22 depicts an exemplary embodiment of a web interface for accessing a community portal, similar to the community portal from FIG. 10.

FIG. 22 depicts an exemplary embodiment of a web interface 2220 for accessing a community portal, similar to the community portal interface 1120 from FIG. 11. More specifically, some nonlimiting examples discussed above describe the community portal interface 1120 being accessed from a local application (e.g., FIG. 8) via selection of the second signifier 836. However, some embodiments may be configured to access the community portal interface 1120 via a web application, such as illustrated in FIG. 22. As illustrated in FIG. 22, the web interface 2220 may include an account login page 2222 to access one or more of the group community pages. More specifically, the account login page 2222 may include a customer login portion 2224 for allowing customers of the community portal provider to login. By logging in under the customer login portion 2224, the user may be provided more customization and/or be permitted to view, upload, and/or download information that is only available to customers.

Also included in the account login page 2222 is a general login portion 2226. The general login portion 2226 can allow any user to simply enter an address (e.g., email address, instant messaging address telephone number, etc.) to access group community pages to which that address is a member. Depending on whether a group requires authentication to access the group community page, a password (or other authenticator mechanism) may be required. Also included is a register option 2228 for registering user information.

Figure 23:
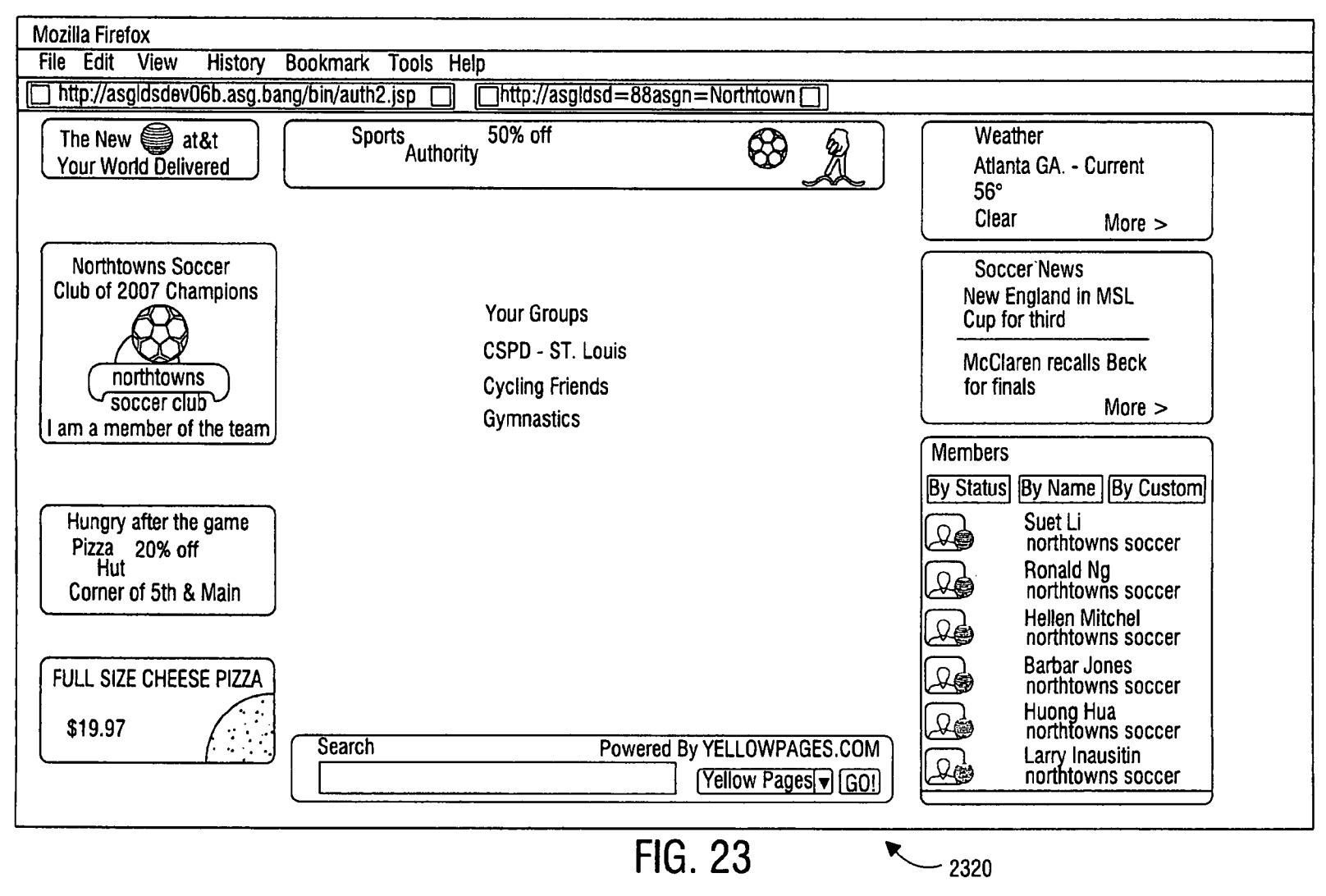

FIG. 23 depicts an exemplary embodiment of a web interface 2320 for providing one or more groups to which a user is a member, similar to the interface from FIG. 22. As illustrated in the nonlimiting example of FIG. 23, the web interface 2320 may be configured to provide a list of groups that to which the user is a member. As a nonlimiting example, after logging into the community portal page from FIG. 22, the user may be provided with a list of one or more groups to which the user is a member. The list may be a selectable list, such that upon selection of a group, the user may be directed to the group community page associated with that group.

Figure 24:
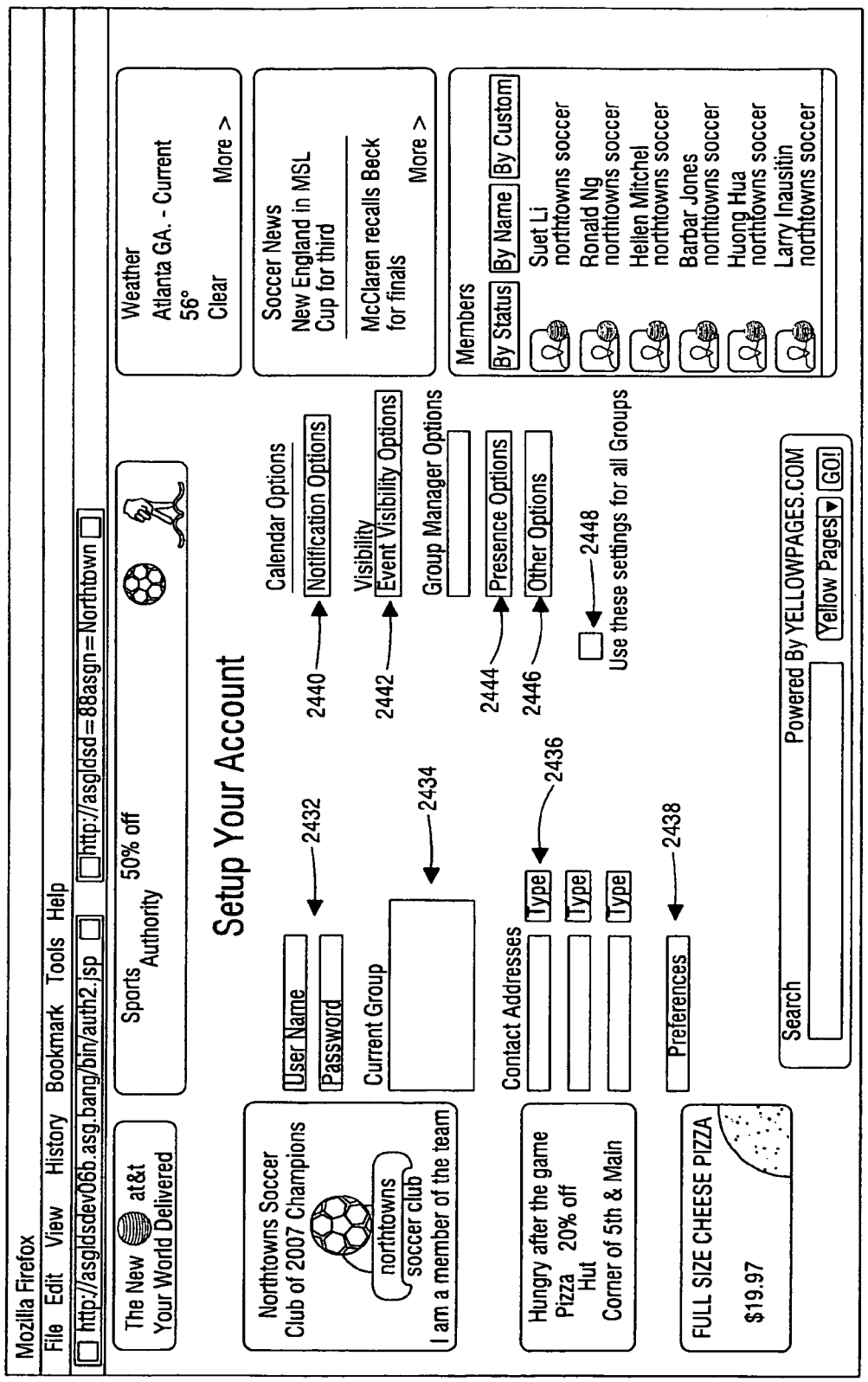
FIG. 24 depicts an exemplary embodiment of a web interface for setting up a user account, similar to the interface from FIG. 22.

FIG. 24 depicts an exemplary embodiment of an account setup interface 2420 for setting up a user account, similar to the interface from FIG. 22. As illustrated, the account setup interface of FIG. 24 may be reached by selection of the register option 2228 from FIG. 22. More specifically the account setup interface 2420 may include one or more options for setting up user preferences for one or more group community pages. As a nonlimiting example, setup options may include a username and password option 2432 and a contact addresses option 2436. The username and password option 2432 provide the user with an option to enter desired login information. Additionally, the contact addresses option 2436 can receive contact addresses, as well as the type of contact address (e.g., cell phone, email address, etc.) for reaching the user. Upon entering a contact address, groups to which that user is a member may be displayed in the current groups window 2434. Additionally included is a preferences option 2438. By selecting the preferences option 2438, the user may be presented with options regarding contacting the user. More specifically, such options may include an option to restrict contact to certain times, dates, and/or addresses, an option to determine a contact order of the listed addresses, and/or other options.

Also included in the account setup interface 2420 are calendar options. As a nonlimiting example, the account setup interface 2420 may include notification options 2440 to determine where notifications are sent (e.g., based on presence, based on a predetermined order, etc.), how notifications are sent (e.g., text message, audio message, video message, picture message, etc.), and when notifications are sent (e.g., a predetermined time before, automatically based on current location, etc.), and/or other options. Similarly, calendar options may include event visibility options 2442. As a nonlimiting example event visibility options 2442 may include options for the user's calendar events to be visible to all members of the group, options for other members' calendar events to be visible to the user, and/or other visibility options.

Additionally included in the nonlimiting example of FIG. 24 are group member options. More specifically, presence options 2444 may be provided for determining whether to show presence, for what devices/addresses to show presence, to show location, for what devices/addresses to show location, and/or other options presence options. Additionally, other options 2446 may also be included. Also included is option 2448 for utilizing the settings selected for all groups to which the user is a member.

Figure 25:
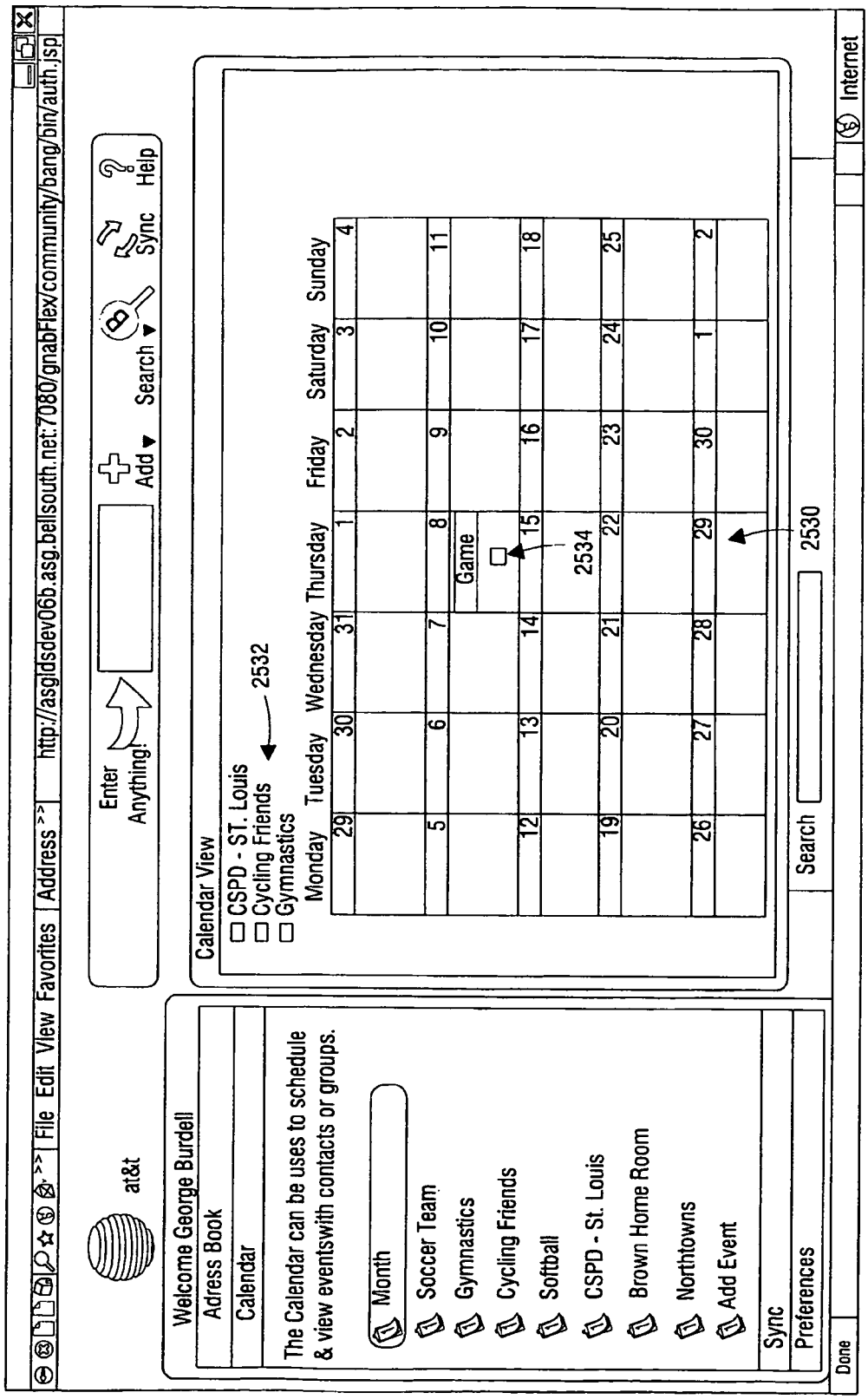
FIG. 25 depicts an exemplary embodiment of a web interface for providing a calendar, similar to the interface from FIG. 24.

FIG. 25 depicts an exemplary embodiment of a web interface 2520 for providing a calendar, similar to the interface from FIG. 23. As illustrated in the nonlimiting example of FIG. 25, the web interface 2520 may be accessed via selection of a group provided from FIG. 23, via selection of the second signifier 836 from FIG. 8, and/or via other actions. Similar to the group calendar interface 1134 from FIG. 11, web interface 2520 is configured to provide a calendar interface 2530 that includes one or more groups to which the user is a member. More specifically, the calendar interface 2530 may include events for one or more groups in a single layout. Additionally, by selecting one or more of the groups listed in area 2532, the user can determine which groups are currently being displayed. Thus, while the user may navigate to a group community page, the user may be provided with all events for that group (both individual and group events) while still having access individual events from other groups. Further, similar functionality may be provided with the calendar interface 1024 from FIG. 10. Similarly, some embodiments allow for a single calendar that includes both individual and group events for all groups.

Also included in the nonlimiting example of FIG. 25 is a selectable location signifier 2534. A selectable location signifier 2534 may be associated with each event and may be configured to provide location information related to the corresponding event, as described with reference to FIG. 25.

Figure 26:
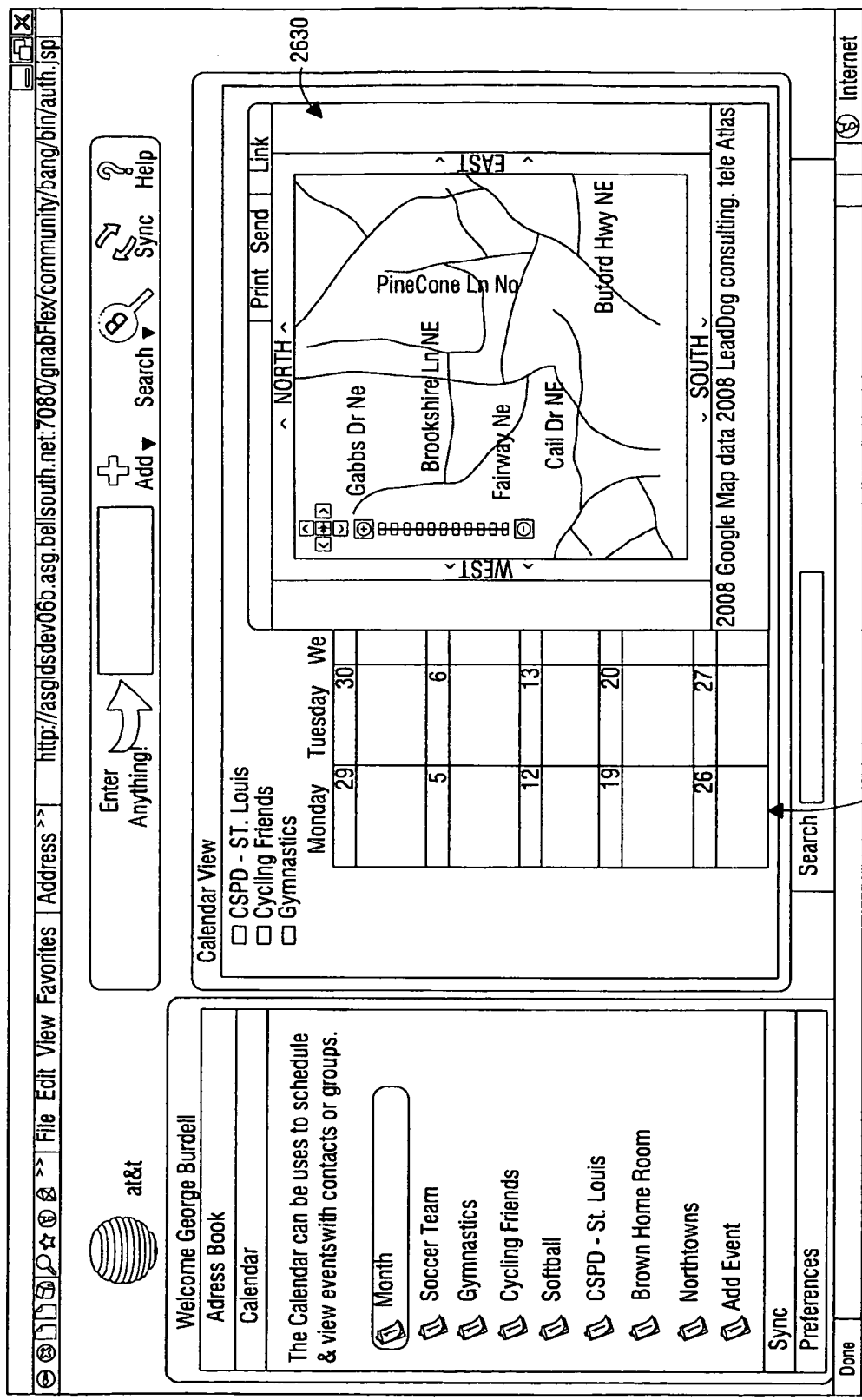
FIG. 26 depicts an exemplary embodiment of a web interface for providing location information regarding an entry of the calendar from FIG. 25.

FIG. 26 depicts an exemplary embodiment of a web interface for providing location information regarding an entry of the calendar from FIG. 25. As illustrated in the nonlimiting example of FIG. 26, in response to selection of the selectable location signifier 2534 from FIG. 25, the user may be presented with a map of the location of the event. Additionally, in some embodiments, based on a determined current user location, directions and approximate time to reach the event can be provided to the user with the map.

Further, depending on the particular configuration, the administrator (and/or other users) may have access to calendar events of members of the group. Accordingly, by selecting the selectable location signifier 2532, the administrator may be able to determine location and approximate time of arrival for one or more members of the group to the event. As a nonlimiting example, if the group is a soccer team and the coach is the administrator, in some embodiments the coach can select a group event (and/or individual event of a player on the team) such as a game with the Flyers and view the members that are party to that event (in this nonlimiting example, the entire team). Additionally, the coach can view where the players are and when they are expected to arrive at the field.

Figure 27:
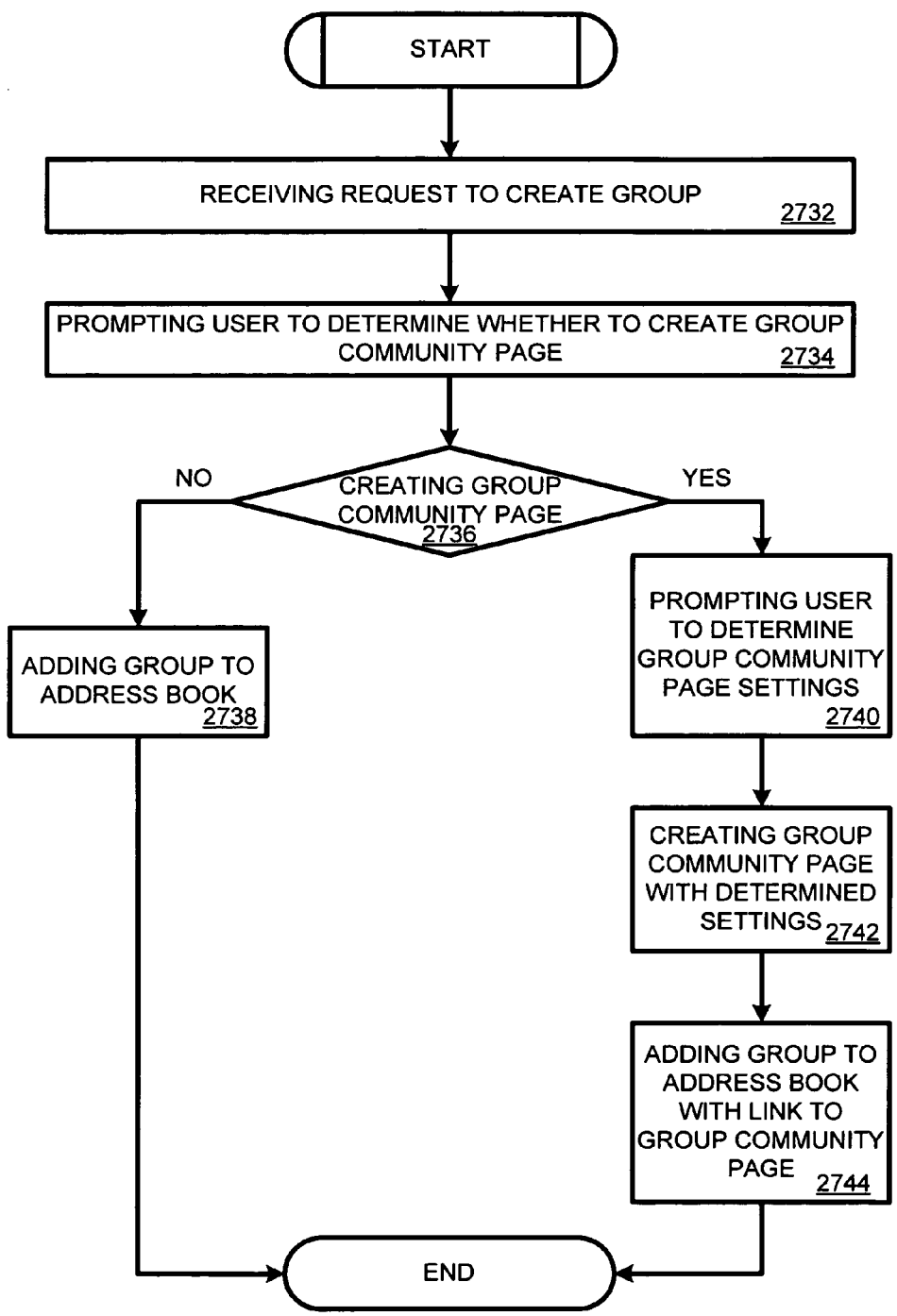
FIG. 27 depicts an exemplary embodiment of a process that may be utilized for creating a group, such as the group depicted in FIG. 8.

FIG. 27 depicts an exemplary embodiment of a process that may be utilized for creating a group, such as the group depicted in FIG. 8. As illustrated in the nonlimiting example of FIG. 27, a request to create a group can be received (e.g., at the portal logic 299-block 2732). This can be received at client device 102 and/or server 106. Additionally, a user can be prompted to determine whether to create a group community page associated with the group (block 2734). A determination can be made whether to create a group community page (block 2736). If a determination is made to not create a group community page, the group can be added to the address book (block 2738). If, however, a determination is made to create a group community page, the user can be prompted to determine group community page settings (block 2740). The group community page can be created with the determined settings (block 2742). Additionally, the group can be added to the address book with a link to the created group community page (block 2744).

Figure 28:
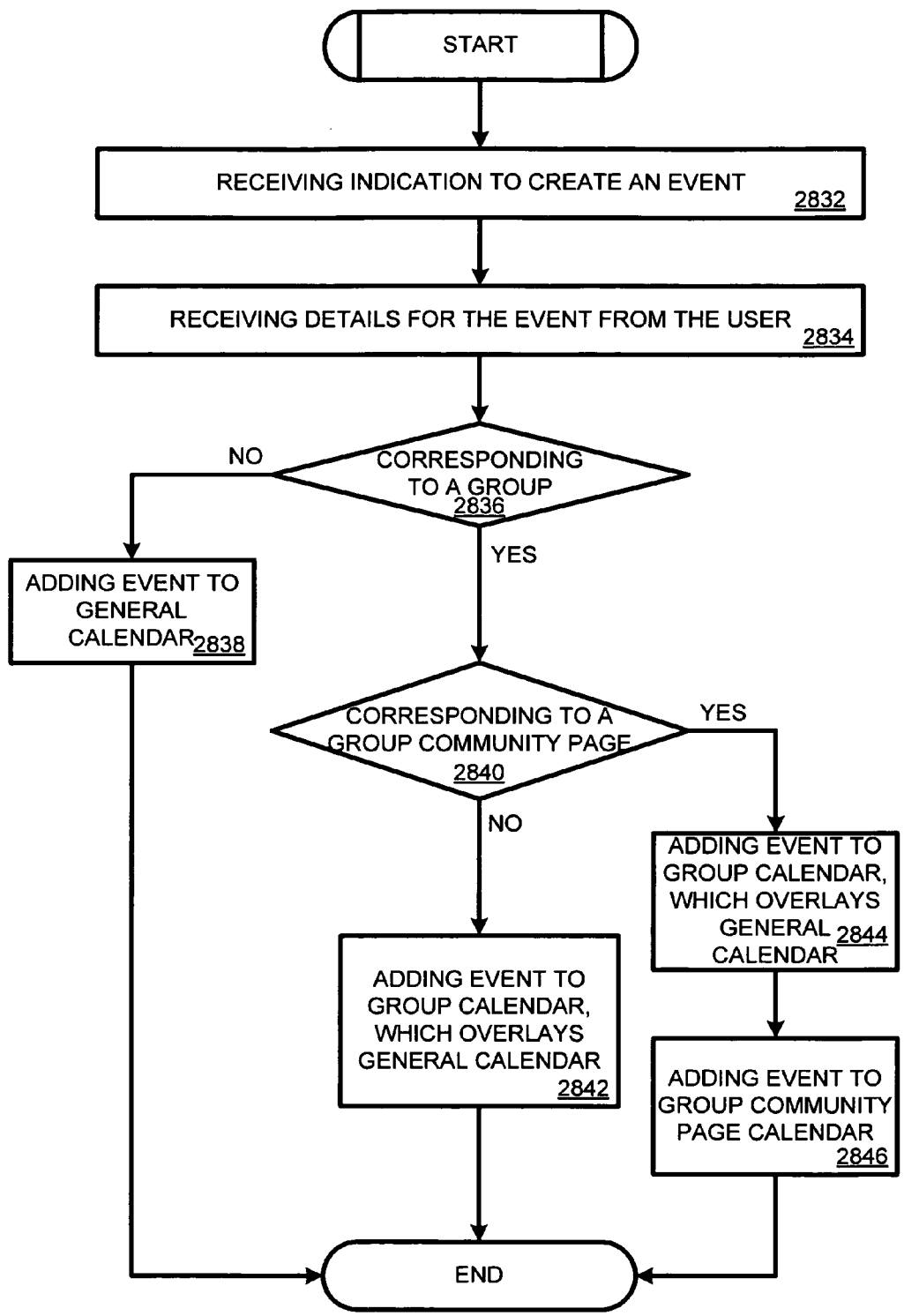
FIG. 28 depicts an exemplary embodiment of a process that may be utilized for adding an event to a calendar, such as the calendar from FIG. 11.

FIG. 28 depicts an exemplary embodiment of a process that may be utilized for adding an event to a calendar, such as the calendar from FIG. 11. As illustrated in the nonlimiting example of FIG. 28, an indication to create a calendar event may be received (e.g., a the portal logic 299) from a user (block 2832). Additionally, event details for the event may be received from the user (block 2834). A determination can then be made regarding whether the received event corresponds to a group (block 2836). If a determination is made that the received event does not correspond to a group, the event can be added to a general calendar (block 2838). However, if a determination is made that the event corresponds to a group, a determination can be made regarding whether the event corresponds to a group community page (block 2840). In response to a determination that the event does not correspond to a group community page, the event can be added to a group calendar, which overlays the general calendar (block 2842). If, at block 2840, a determination is made that the event does correspond to a group community page, the event can be added to the group calendar, which overlays the general calendar (block 2844). The event may also be added to the group community page calendar (block 2846).

Figure 29:
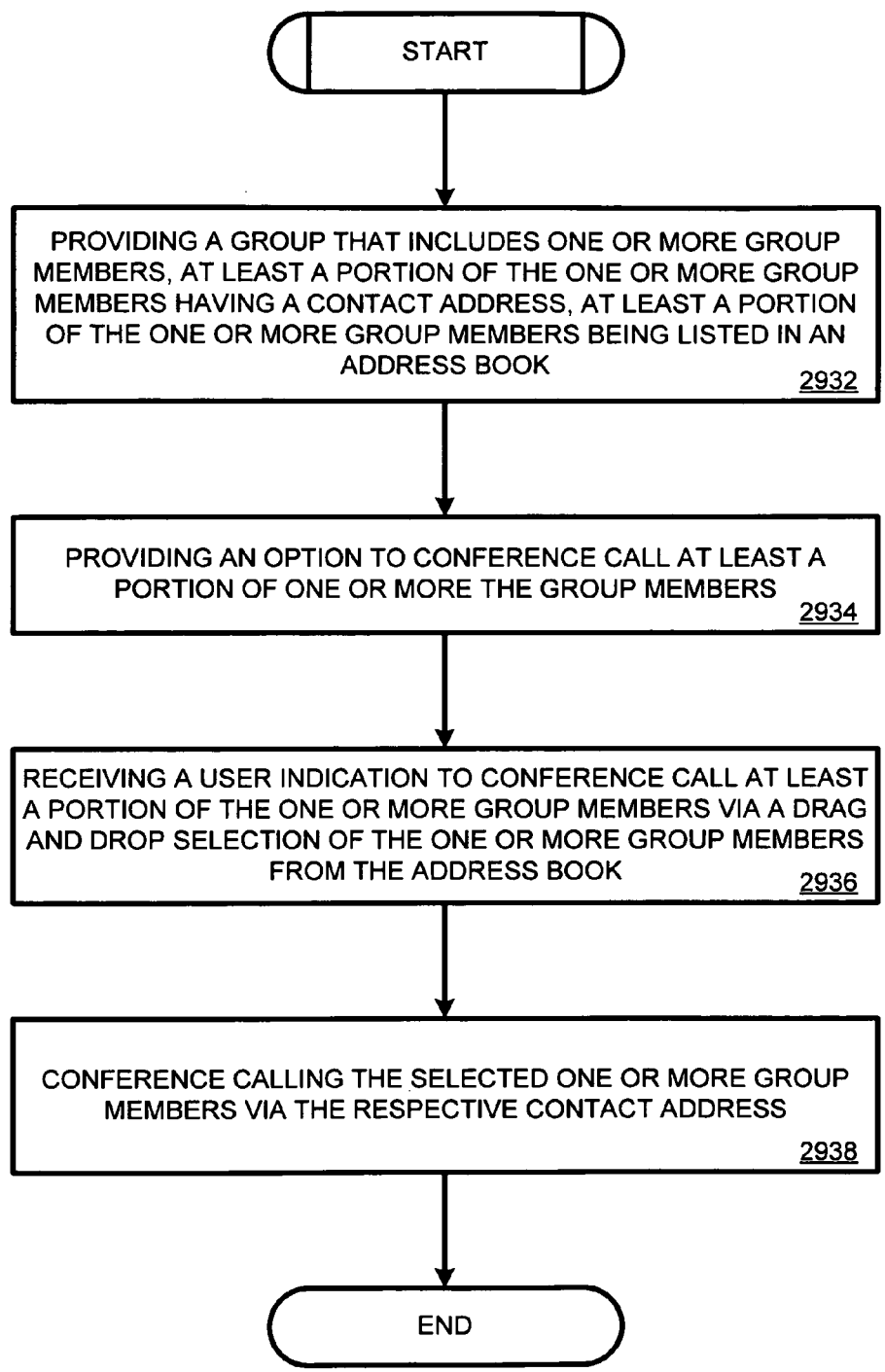
FIG. 29 depicts an exemplary embodiment of a process that may be utilized for placing a conference call, similar to the process from FIG. 28.

FIG. 29 depicts an exemplary embodiment of a process that may be utilized for placing a conference call, similar to the process from FIG. 27. As illustrated in the nonlimiting example of FIG. 29, a group can be provided (e.g., via the portal logic 299), where the group includes one or more group members and at least a portion of the one or more group members have a contact address, and where at least a portion of the one or more group members are listed in an address book (block 2932). Additionally, an option to facilitate a conference call can be provided to at least one of the one or more group members (block 2934). A user indication to facilitate a conference call at least a portion of the one or more group members may be received via a drag and drop selection of the group members from the address book (block 2936). Additionally, the at least one selected group members can be conference called via the respective contact address (block 2938).

Figure 30:
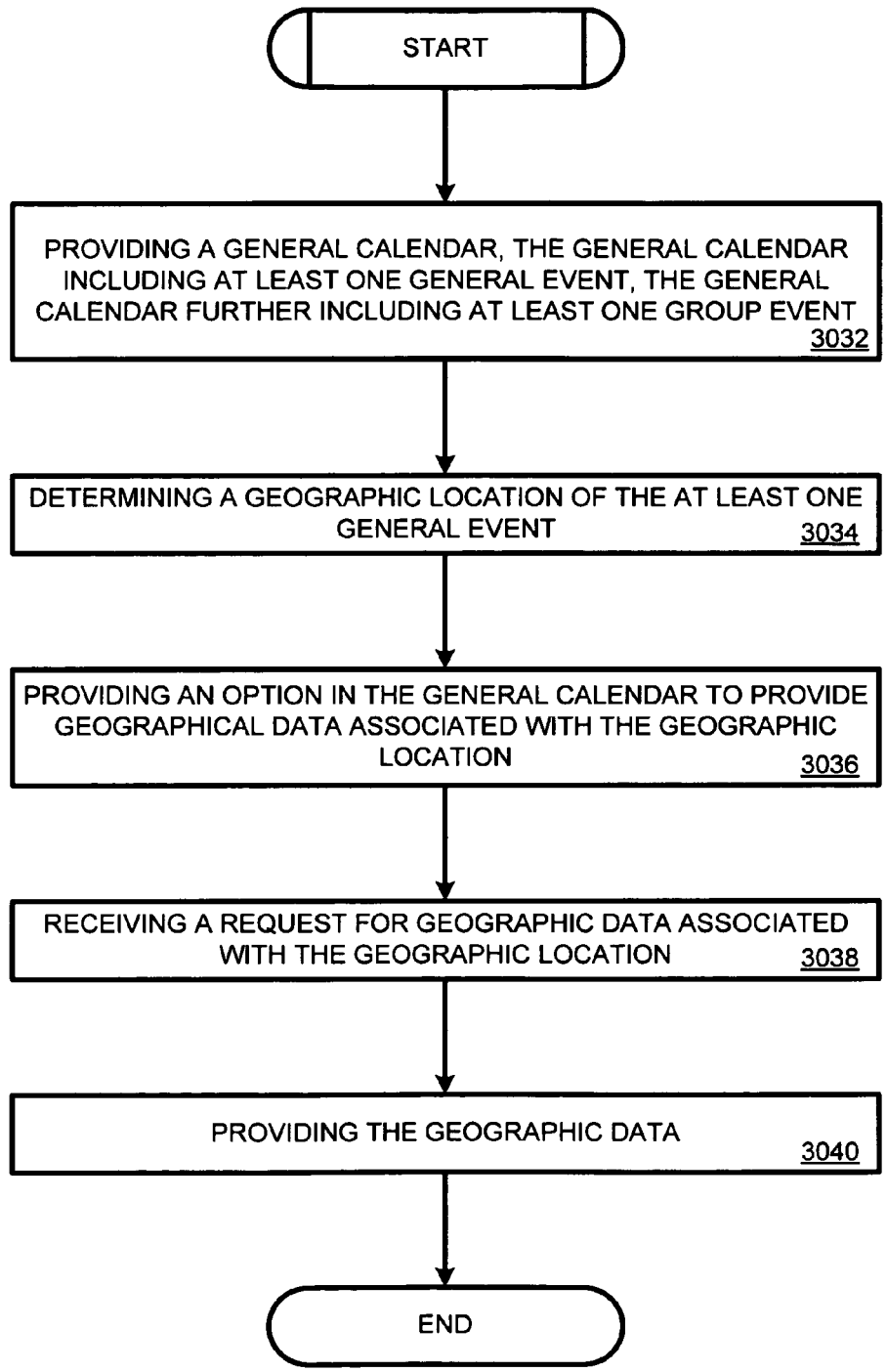
FIG. 30 depicts an exemplary embodiment of a process that may be utilized for providing location data regarding a calendar event, similar to the diagram from FIG. 29.

FIG. 30 depicts an exemplary embodiment of a process that may be utilized for providing location data regarding a calendar event, similar to the diagram from FIG. 28. As illustrated in the nonlimiting example of FIG. 30, a general calendar can be provided (e.g., via the portal logic 299), where the general calendar includes at least one general event, and where the general calendar includes at least one group event (block 3032). A location of at least one of the general events can be determined (block 3034). Additionally, an option may be provided in the general calendar to provide location data associated with the determined location (block 3036). A receive request for the location data can be received (block 3038). The location data can then be provided (block 3040).

Figure 31:
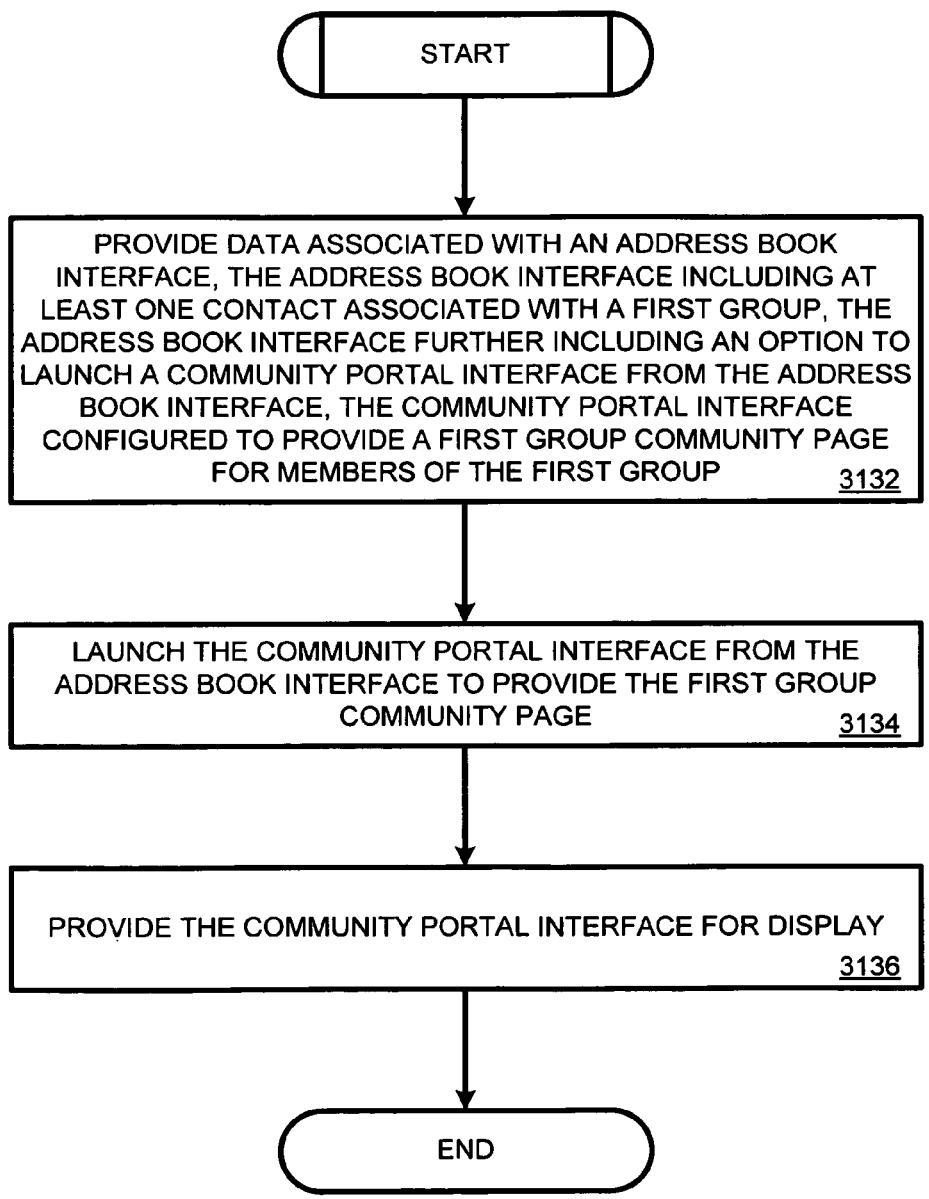
FIG. 31 depicts an exemplary embodiment of a process that may be utilized for providing a community portal for display, similar to the diagram from FIG. 30.

FIG. 31 depicts an exemplary embodiment of a process that may be utilized for providing a community portal for display, similar to the diagram from FIG. 30. More specifically, as illustrated in the nonlimiting example of FIG. 31, the portal logic 299 can provide data associated with an address book interface, the address book interface including at least one contact associated with a first group, the address book interface may further include an option to launch a community portal interface from the address book interface, the community portal interface being configured to provide a first group community page for members of the group (block 3132). Additionally, the portal logic 299 can launch the community portal interface from the address book interface to provide the first group community page (block 3134). The portal logic 299 may also provide the community portal interface for display (block 3136).

Figure 32:
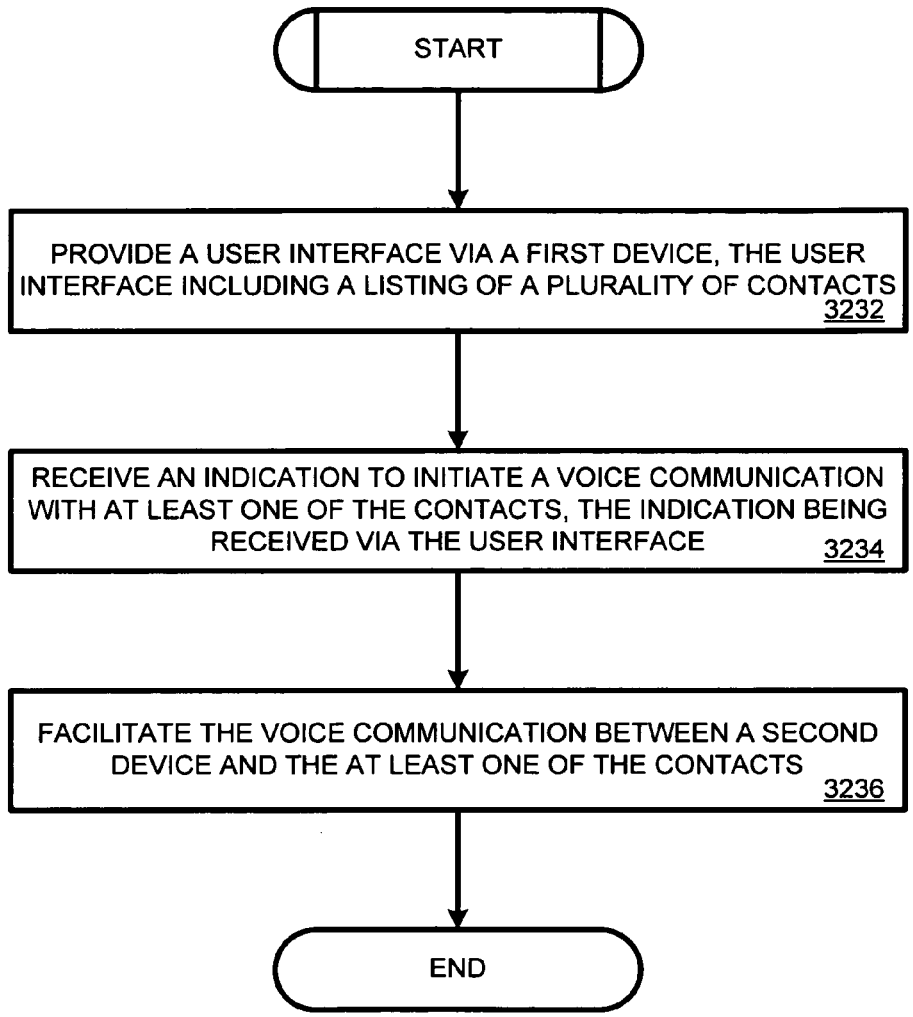
FIG. 32 depicts an exemplary embodiment of a process that may be utilized for facilitating a voice communication between a device and a contact, similar to the diagram from FIG. 31.

FIG. 32 depicts an exemplary embodiment of a process that may be utilized for facilitating a voice communication between a device and a contact, similar to the diagram from FIG. 31. As illustrated in the nonlimiting example of FIG. 32, the portal logic 299 can provide a user interface via a first device, the user interface including a listing of a plurality of contacts (block 3232). The portal logic 299 may receive an indication to initiate a voice communication with at least one of the contacts, where the indication is received via the user interface (block 3234). Additionally, the portal logic 299 can facilitate the voice communication between a second device and the at least one of the contacts (block 3236).

Figure 33:
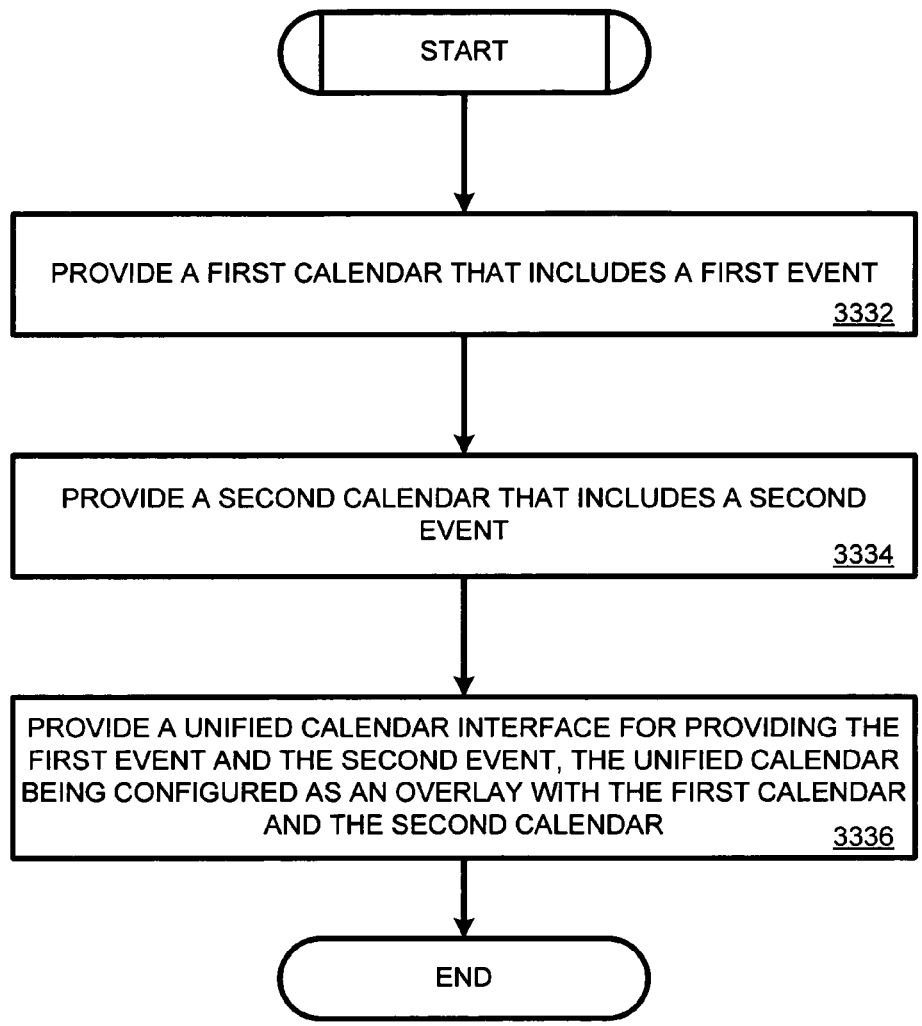
FIG. 33 depicts an exemplary embodiment of a process that may be utilized for providing an overlay calendar, similar to the diagram from FIG. 32.

FIG. 33 depicts an exemplary embodiment of a process that may be utilized for providing an overlay calendar, similar to the diagram from FIG. 32. As illustrated in the nonlimiting example of FIG. 33, the portal logic 299 can provide a first calendar that includes a first event (block 3332). The portal logic 299 can provide a second calendar that includes a second event (block 3334). Additionally, the portal logic 299 can provide a unified calendar interface for providing the first event and the second event, where the unified calendar is configured as an overlay with the first calendar and the second calendar (block 3336).

Figure 34:
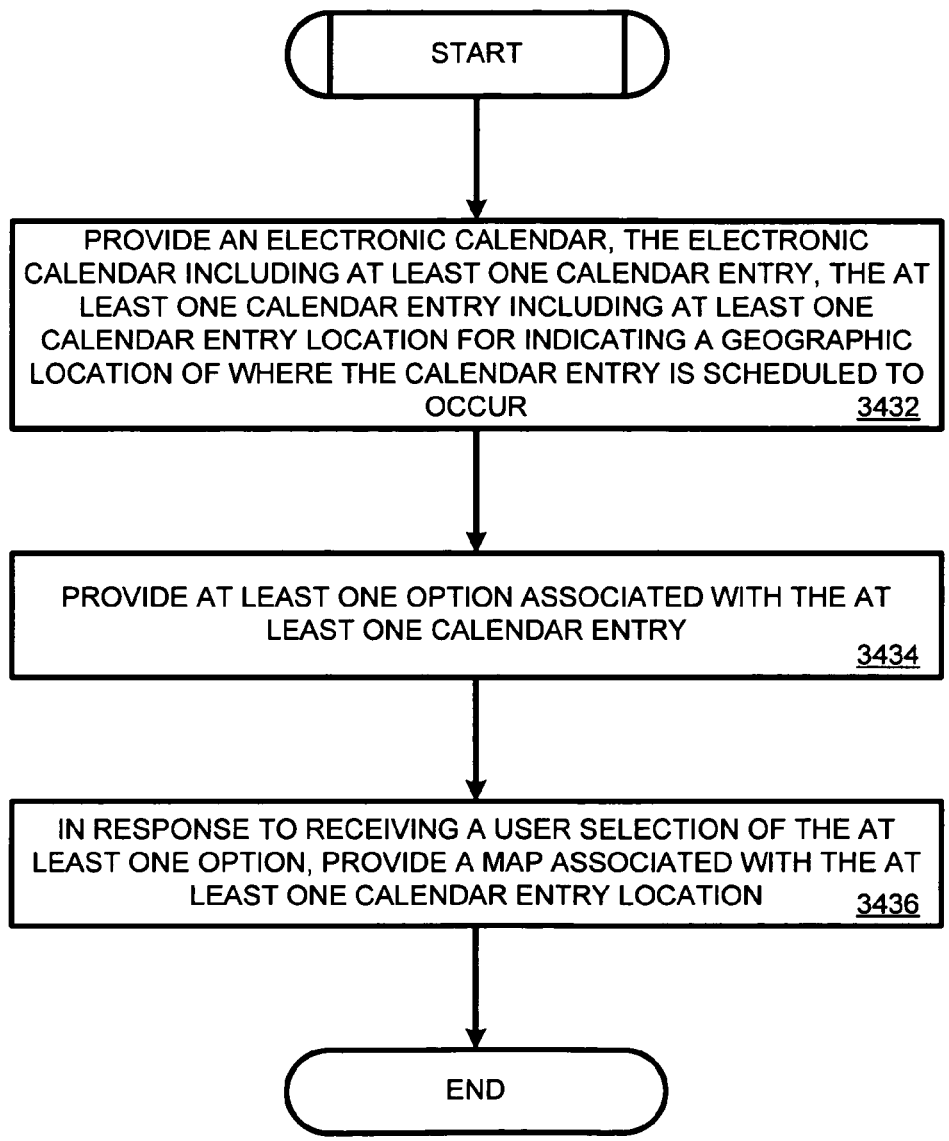
FIG. 34 depicts an exemplary embodiment of a process that may be utilized for providing a map associated with a calendar entry location, similar to the diagram from FIG. 33.

FIG. 34 depicts an exemplary embodiment of a process that may be utilized for providing a map associated with a calendar entry location, similar to the diagram from FIG. 33. As illustrated in the nonlimiting example of FIG. 34, the portal logic 299 can provide an electronic calendar, the electronic calendar including at least one calendar entry, the at least one calendar entry including at least one calendar entry location for indicating a geographic location of where the calendar entry is scheduled to occur (block 3432). The portal logic can provide at least one option associated with the at least one calendar entry (block 3434). The portal logic 299 can, in response to receiving a user selection of the at least one option, provide a map associated with the at least one calendar entry location (block 3436).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), flash memory, an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "scan," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should also be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A computer-implemented method, comprising:
    maintaining, by a processor, a group listing of a plurality of contacts, wherein each of the plurality of contacts is designated as a member of a common group,
    providing, by the processor, a graphical calendar interface box displaying an electronic group calendar whose accessibility is restricted to members of the common group, the electronic group calendar including a calendar entry including a scheduled date and time for the calendar entry, the calendar entry including a calendar entry location for indicating a geographic location of where the calendar entry is scheduled to occur, wherein the calendar entry is scheduled for each of the members of the common group;
    providing, by the processor, a map option associated with the calendar entry on a user interface of the graphical calendar interface box available to be viewed by members of the common group, the map option comprising a selectable location signifier, the selectable location signifier comprising an event identifier and a selectable indicator the event identifier and the selectable indicator being associated with the calendar entry, and in which a separate event identifier and a separate selectable indicator are provided for each additional calendar entry;
    in response to receiving a user selection of the map option, providing, by the processor, a map associated with the calendar entry location, wherein the map is displayed within the graphical calendar interface box, to only partially obscure a month at a time view within the graphical calendar interface box, and the user is a member of the common group, wherein the map indicates current locations of the members with respect to the calendar entry location as determined by a global positioning system and further indicates expected arrival times; and
    sending, by the processor, an event reminder notification to at least one member of the common group at a predetermined time before the scheduled time for a particular calendar entry on the electronic group calendar, wherein an event reminder notification for a particular member of the common group is prevented from being sent when the particular member of the common group is determined to be currently located at the calendar entry location.

2. The method of claim 1, further comprising accessing a third party website to provide the map.

3. The method of claim 1, further comprising receiving a user indication to create the calendar entry, wherein the user indication is provided from one of the members of the common group.

4. The method of claim 3, further comprising, in response to receiving the user indication to create the calendar entry, determining the map associated with the calendar entry location.

5. The method of claim 4, further comprising storing the calendar entry location.

6. The method of claim 1, wherein the electronic group calendar is provided via a group community portal.

7. A system, comprising:
    a memory that stores executable instructions; and
    a processor, implemented on the system, that executes the executable instructions, including:
    first logic configured to maintain a group listing of a plurality of contacts, wherein each of the plurality of contacts is designated as a member of a common group,
    second logic configured to provide a graphical calendar interface box displaying an electronic group calendar whose accessibility is restricted to members of the common group, the electronic group calendar including a calendar entry including a scheduled date and time for the calendar entry, the calendar entry including a calendar entry location for indicating a geographic location of where the calendar entry is scheduled to occur, wherein the calendar entry is scheduled for each of the members of the common group;
    third logic configured to provide a map option associated with the calendar entry on a user interface of the graphical calendar interface box available to be viewed by members of the common group, the map option comprising a selectable location signifier, the selectable location signifier comprising an event identifier and a selectable indicator the event identifier and the selectable indicator being associated with the calendar entry, and in which a separate event identifier and a separate selectable indicator are provided for each additional calendar entry;
    fourth logic configured to, in response to receiving a user selection of the map option, provide a map associated with the calendar entry location, wherein the map is displayed within the graphical calendar interface box, to only partially obscure a month at a time view within the graphical calendar interface box, and the user is a member of the common group, wherein the map indicates current locations of the members with respect to the calendar entry location as determined by a global positioning system and further indicates expected arrival times; and fifth logic configured to send an event reminder notification to a member of the common group at a predetermined time before the scheduled time for a particular calendar entry on the electronic group calendar, wherein an event reminder notification for a particular member of the common group is prevented from being sent when the particular member of the common group is determined to be currently located at the calendar entry location.

8. The system of claim 7, the memory further storing sixth logic configured to access a third party website to provide the map.

9. The system of claim 7, the memory further storing seventh logic configured to receive a user indication to create the calendar entry, wherein the user indication is provided from one of the members of the common group.

10. The system of claim 9, the memory further storing eighth logic configured to, in response to receiving the user indication to create the calendar entry, determine the map associated with the calendar entry location.

11. The system of claim 10, the memory further storing seventh logic configured to store the calendar entry location.

12. The system of claim 7, wherein the electronic group calendar is provided via a group community portal.

13. A non-transitory computer-readable storage medium encoded with an executable computer program for associating a map with a calendar entry and that, when executed by a processor, causes the processor to perform operations comprising:

maintaining a group listing of a plurality of contacts, wherein each of the plurality of contacts is designated as a member of a common group, providing a graphical calendar interface box displaying an electronic group calendar whose accessibility is restricted to members of the common group, the electronic group calendar including a calendar entry including a scheduled date and time for the calendar entry, the calendar entry including a calendar entry location for indicating a geographic location of where the calendar entry is scheduled to occur, wherein the calendar entry is scheduled for each of the members of the common group;

providing a map option associated with the calendar entry on a user interface of the graphical calendar interface box available to be viewed by members of the common group, the map option comprising a selectable location signifier, the selectable location signifier comprising an event identifier and a selectable indicator, the event identifier and the selectable indicator being associated with the calendar entry, and in which a separate event identifier and a separate selectable indicator are provided for each additional calendar entry;

providing, in response to receiving a user selection of the map option, a map associated with the calendar entry location, wherein the map is displayed within the graphical calendar interface box, to only partially obscure a month at a time view within the graphical calendar interface box, and the user is a member of the common group, wherein the map indicates current locations of the members with respect to the calendar entry location as determined by a global positioning system and further indicates expected arrival times; and sending an event reminder notification to a member of the common group at a predetermined time before the scheduled time for a particular calendar entry on the electronic group calendar, wherein an event reminder notification for a particular member of the common group is prevented from being sent when the particular member of the common group is determined to be currently located at the calendar entry location.

14. The non-transitory computer-readable storage medium of claim 13, the operations further comprising causing the computer to access a third party website to provide the map.

15. The non-transitory computer-readable storage medium of claim 13, the operations further comprising causing the computer to receive a user indication to create the calendar entry, wherein the user indication is provided from one of the members of the common group.

16. The non-transitory computer-readable storage medium of claim 15, the operations further comprising causing the computer to, in response to receiving the user indication to create the calendar entry, determine the map associated with the calendar entry location.

17. The non-transitory computer-readable storage medium of claim 13, the operations further comprising causing the computer to store the calendar entry location.

18. The non-transitory computer-readable storage medium of claim 13, wherein the electronic group calendar is provided via a group community portal.

* * * * *

UNITED STATES PATENT AND TRADEMARK OFFICE
CERTIFICATE OF CORRECTION

PATENT NO. : 8,543,441 B2  
APPLICATION NO. : 12/391901  
DATED : September 24, 2013  
INVENTOR(S) : L. Siegel Page 1 of 1

It is certified that error appears in the above-identified patent and that said Letters Patent is hereby corrected as shown below:

In the Claims

At column 19, line 59 (claim 1, line 21) of the printed patent, please insert --,-- after indicator.

At column 20, line 52 (claim 7, line 24) of the printed patent, please insert --,-- after indicator.

Signed and Sealed this
Twentieth Day of May, 2014

Michelle K. Lee
*Deputy Director of the United States Patent and Trademark Office*